US012643258B2

(12) United States Patent
Yao

(10) Patent No.: US 12,643,258 B2
(45) Date of Patent: Jun. 2, 2026

(54) BOARD MATERIAL AND A PREPARATION METHOD THEREOF

(71) Applicant: Der Future Science & Technology Holding Group Co., Ltd., Suzhou (CN)

(72) Inventor: Hongpeng Yao, Suzhou (CN)

(73) Assignee: Der Future Science & Technology Holding Group Co., Ltd., Suzhou (CN)

( * ) Notice: Subject to any disclaimer, the term of this patent is extended or adjusted under 35 U.S.C. 154(b) by 0 days.

(21) Appl. No.: 18/884,631

(22) Filed: Sep. 13, 2024

(65) Prior Publication Data

US 2026/0042238 A1 Feb. 12, 2026

(30) Foreign Application Priority Data

Aug. 8, 2024 (CN) .......................... 202411080869.1

(51) Int. Cl.
*B32B 21/04* (2006.01)
*B27D 1/04* (2006.01)
(Continued)

(52) U.S. Cl.
CPC .............. *B27N 3/002* (2013.01); *B27D 1/04* (2013.01); *B27N 1/02* (2013.01); *B27N 3/08* (2013.01);
(Continued)

(58) Field of Classification Search
CPC ... B32B 21/042; B32B 2317/16; B32B 21/08; B32B 21/14; B27D 1/06; B27N 3/00;
(Continued)

(56) References Cited

U.S. PATENT DOCUMENTS

| | | | | |
|---|---|---|---|---|
| 9,688,056 | B2 * | 6/2017 | Beuchel | B32B 27/36 |
| 11,701,815 | B2 * | 7/2023 | Barnes | B32B 37/04 |
| | | | | 264/308 |
| 2023/0330980 | A1 * | 10/2023 | Drevet | B32B 7/12 |

FOREIGN PATENT DOCUMENTS

| | | |
|---|---|---|
| CN | 101016798 A | 8/2007 |
| CN | 101070238 A | 11/2007 |

(Continued)

OTHER PUBLICATIONS

Civil Engineering Materials 2nd edition, Jan. 31, 2018, Guosheng Liao, Beijing: Metallurgical Industry Press, pp. 28, 29.

(Continued)

*Primary Examiner* — Joanna Pleszczynska
(74) *Attorney, Agent, or Firm* — Rankin, Hill & Clark LLP

(57) ABSTRACT

The present disclosure provides a board material and a preparation method thereof. The board material of the present disclosure includes: an inorganic board, the inorganic board includes a plant fiber and an inorganic material, in which the mass ratio of the inorganic material to the plant fiber ranges from 1.2 to 1.5; the raw material components of the inorganic material include a magnesium sulfate, a magnesium oxide, a magnesium chloride and a modifier, the mass ratio of the magnesium sulfate to the magnesium oxide ranges from 0.4 to 0.5; the mass ratio of magnesium chloride to magnesium oxide ranges from 0.05 to 0.15; the mass ratio of the modifier to the magnesium chloride ranges from 0.025 to 0.045; the 24 h water-absorbing thickness swelling of the inorganic board is less than or equal to 3%.

13 Claims, 10 Drawing Sheets

(51) Int. Cl.

| | |
|---|---|
| *B27N 1/02* | (2006.01) |
| *B27N 3/00* | (2006.01) |
| *B27N 3/08* | (2006.01) |
| *B32B 7/03* | (2019.01) |
| *B32B 7/12* | (2006.01) |
| *B32B 21/14* | (2006.01) |
| *B32B 37/06* | (2006.01) |
| *B32B 37/10* | (2006.01) |
| *B32B 37/12* | (2006.01) |
| *C04B 28/10* | (2006.01) |

(52) U.S. Cl.

CPC ................ *B32B 7/03* (2019.01); *B32B 7/12* (2013.01); *B32B 21/042* (2013.01); *B32B 37/06* (2013.01); *B32B 37/10* (2013.01); *B32B 37/1284* (2013.01); *B32B 2307/7265* (2013.01); *B32B 2309/022* (2013.01); *B32B 2317/16* (2013.01)

(58) Field of Classification Search

CPC .......... B27N 1/02; B27N 3/002; C04B 28/10; E04F 15/00

See application file for complete search history.

(56) References Cited

FOREIGN PATENT DOCUMENTS

| CN | 110746174 A | 2/2020 |
|---|---|---|
| CN | 111302758 A | 6/2020 |
| CN | 112250416 A | 1/2021 |
| CN | 113844134 A | 12/2021 |

OTHER PUBLICATIONS

First Office Action issued in corresponding CN application No. 2024110808691 dated Sep. 30, 2024.

Notice of allowance issued in corresponding CN application No. 2024110808691 dated Oct. 21, 2024.

* cited by examiner

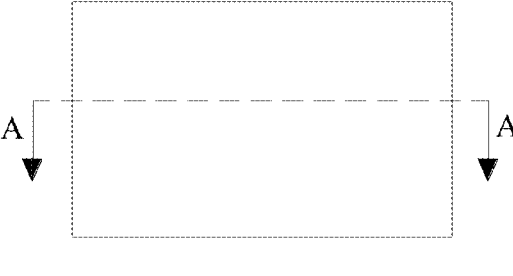
FIG.1
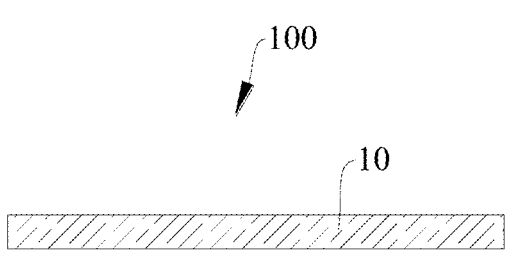
FIG.2
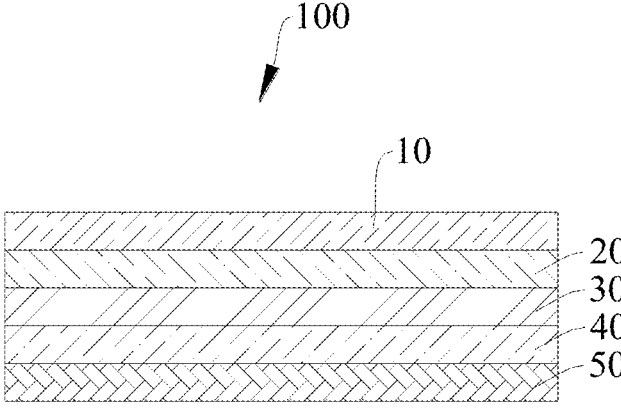
FIG.3

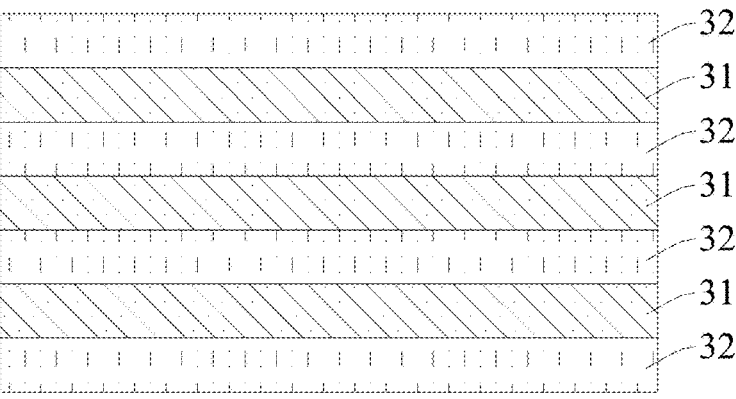
FIG. 4
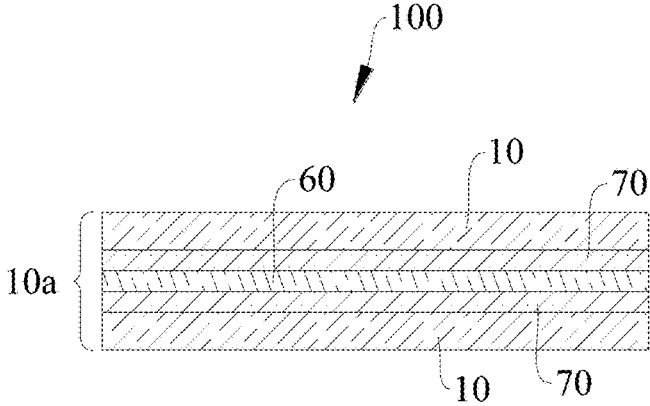
FIG. 5
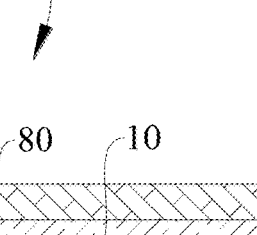
FIG. 6

100

100

100

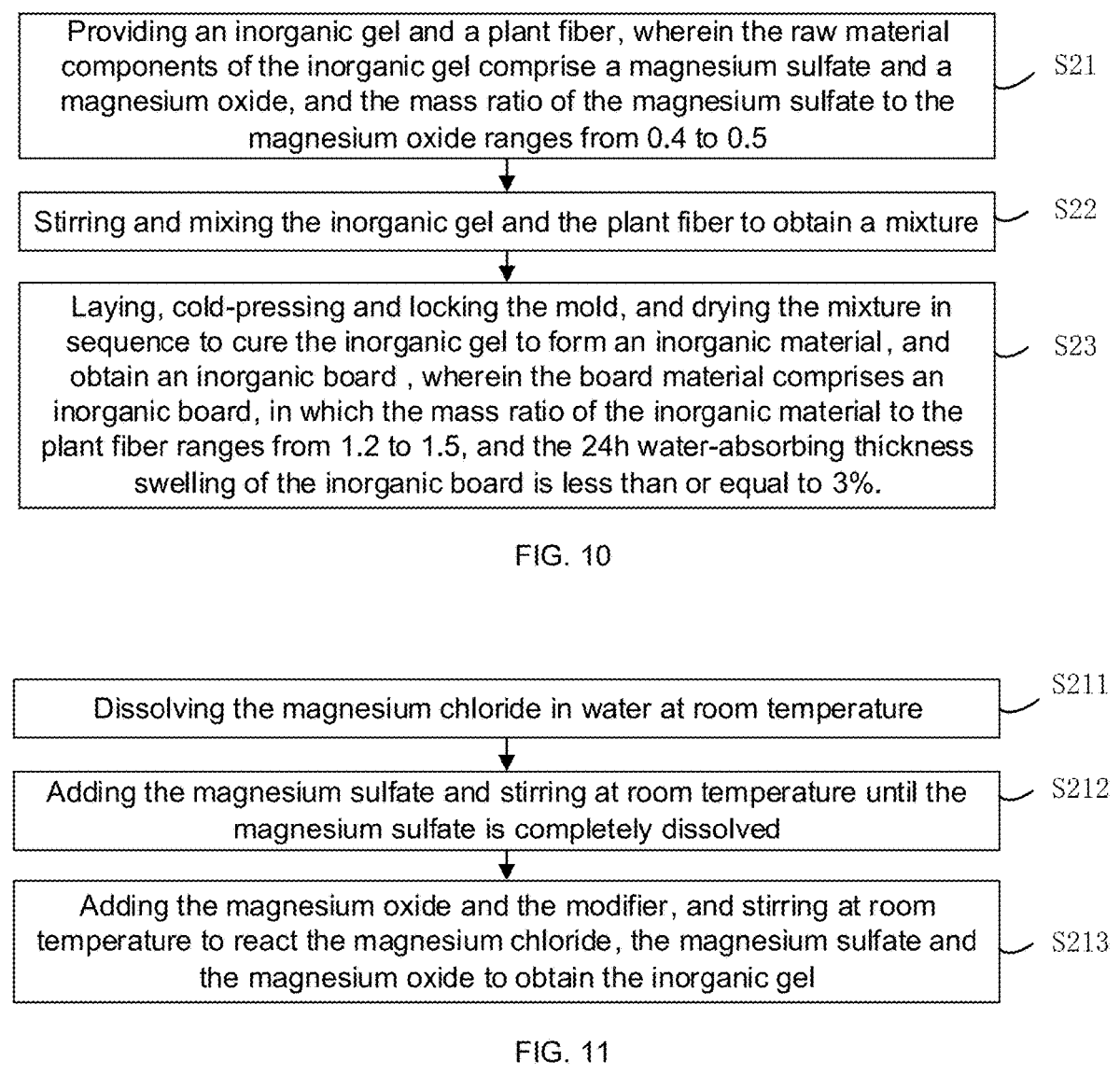

Providing an inorganic gel and a plant fiber, wherein the raw material components of the inorganic gel comprise a magnesium sulfate and a magnesium oxide, and the mass ratio of the magnesium sulfate to the magnesium oxide ranges from 0.4 to 0.5 — S21

Stirring and mixing the inorganic gel and the plant fiber to obtain a mixture — S22

Laying, cold-pressing and locking the mold, and drying the mixture in sequence to cure the inorganic gel to form an inorganic material, and obtain an inorganic board , wherein the board material comprises an inorganic board, in which the mass ratio of the inorganic material to the plant fiber ranges from 1.2 to 1.5, and the 24h water-absorbing thickness swelling of the inorganic board is less than or equal to 3%. — S23

FIG. 10

Dissolving the magnesium chloride in water at room temperature — S211

Adding the magnesium sulfate and stirring at room temperature until the magnesium sulfate is completely dissolved — S212

Adding the magnesium oxide and the modifier, and stirring at room temperature to react the magnesium chloride, the magnesium sulfate and the magnesium oxide to obtain the inorganic gel — S213

FIG. 11

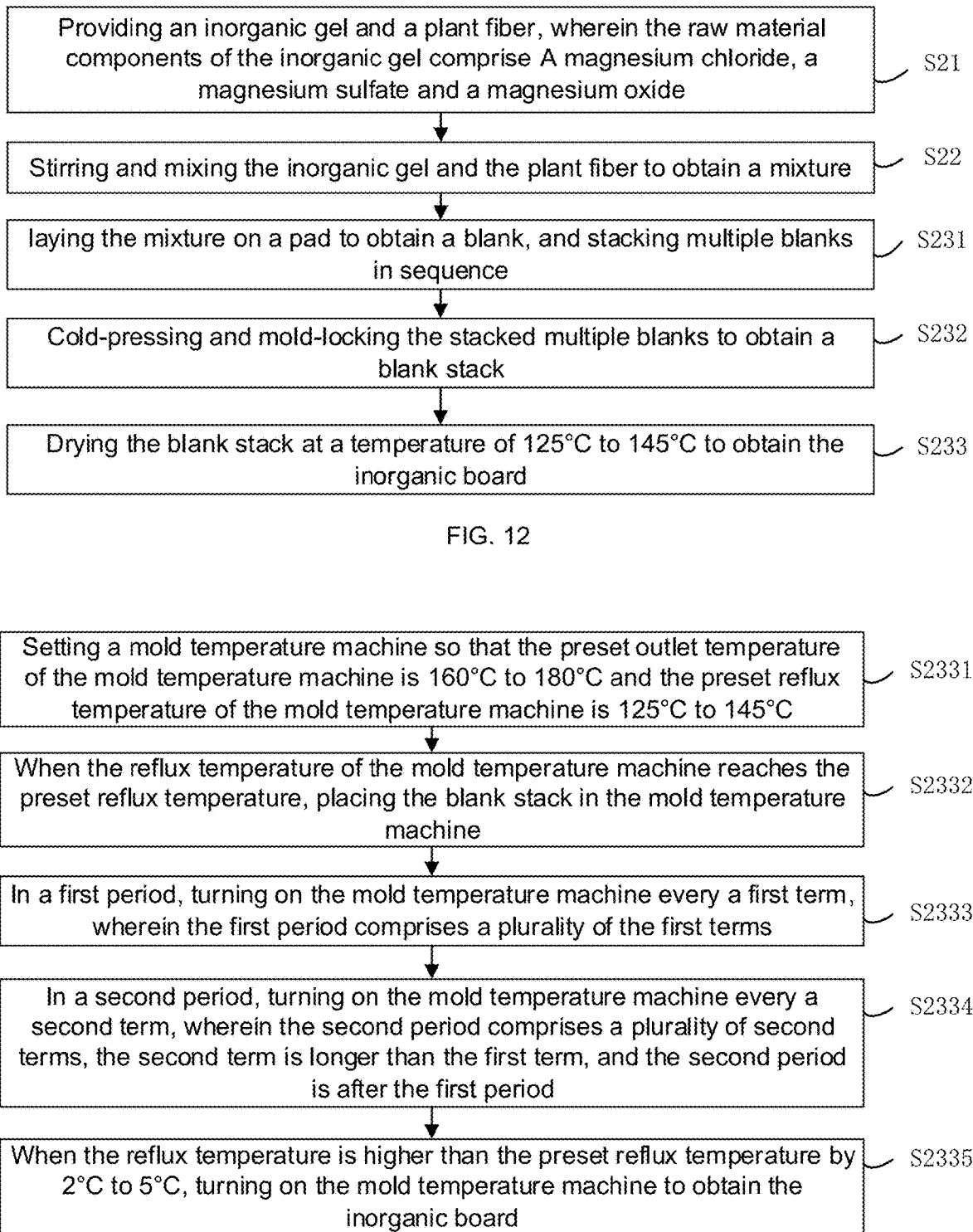

Providing an inorganic gel and a plant fiber, wherein the raw material components of the inorganic gel comprise A magnesium chloride, a magnesium sulfate and a magnesium oxide — S21

Stirring and mixing the inorganic gel and the plant fiber to obtain a mixture — S22 laying the mixture on a pad to obtain a blank, and stacking multiple blanks in sequence — S231

Cold-pressing and mold-locking the stacked multiple blanks to obtain a blank stack — S232

Drying the blank stack at a temperature of 125°C to 145°C to obtain the inorganic board — S233

FIG. 12

Setting a mold temperature machine so that the preset outlet temperature of the mold temperature machine is 160°C to 180°C and the preset reflux temperature of the mold temperature machine is 125°C to 145°C — S2331

When the reflux temperature of the mold temperature machine reaches the preset reflux temperature, placing the blank stack in the mold temperature machine — S2332

In a first period, turning on the mold temperature machine every a first term, wherein the first period comprises a plurality of the first terms — S2333

In a second period, turning on the mold temperature machine every a second term, wherein the second period comprises a plurality of second terms, the second term is longer than the first term, and the second period is after the first period — S2334

When the reflux temperature is higher than the preset reflux temperature by 2°C to 5°C, turning on the mold temperature machine to obtain the inorganic board — S2335

FIG. 13

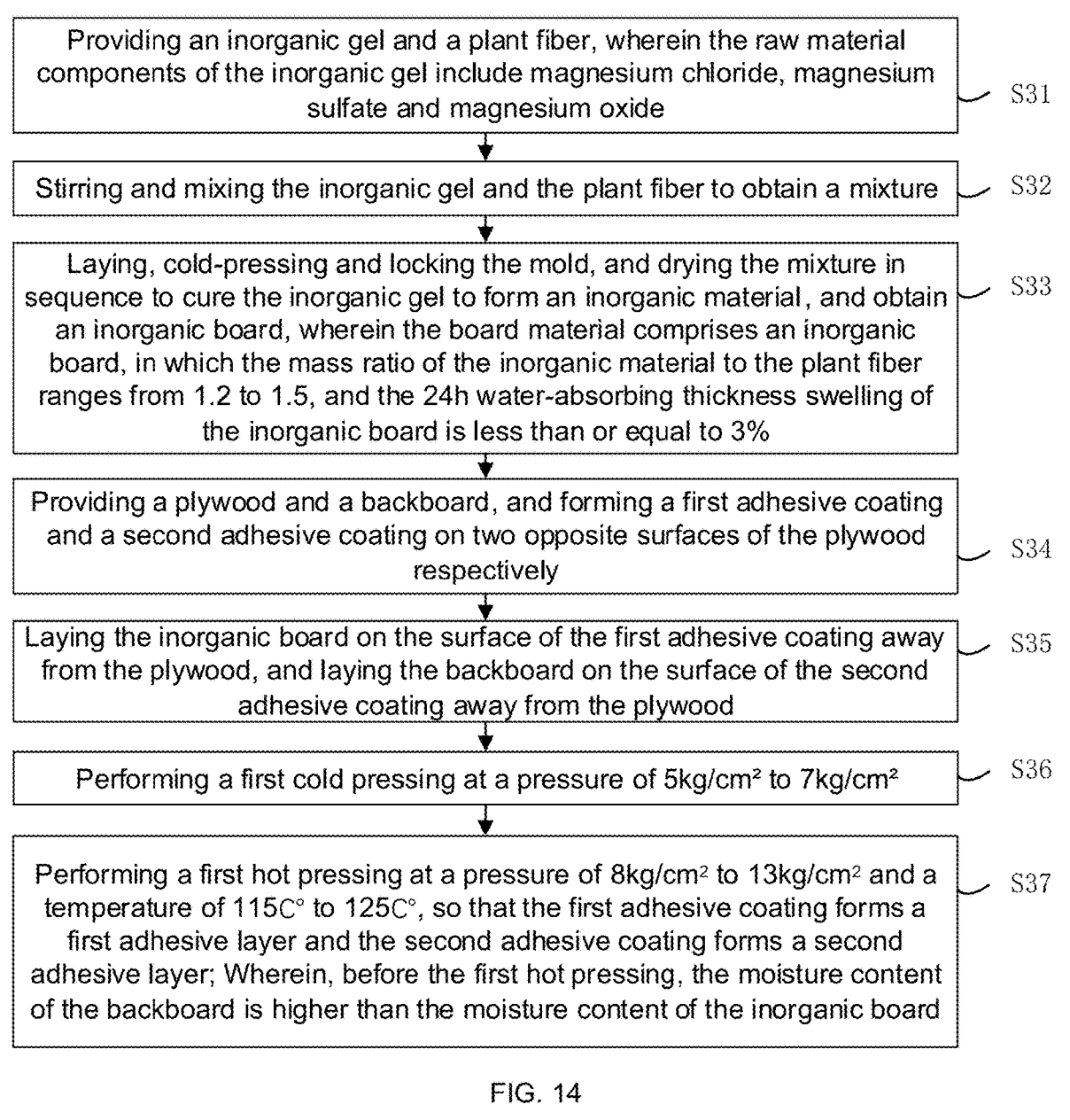

Providing an inorganic gel and a plant fiber, wherein the raw material components of the inorganic gel include magnesium chloride, magnesium sulfate and magnesium oxide — S31

Stirring and mixing the inorganic gel and the plant fiber to obtain a mixture — S32

Laying, cold-pressing and locking the mold, and drying the mixture in sequence to cure the inorganic gel to form an inorganic material, and obtain an inorganic board, wherein the board material comprises an inorganic board, in which the mass ratio of the inorganic material to the plant fiber ranges from 1.2 to 1.5, and the 24h water-absorbing thickness swelling of the inorganic board is less than or equal to 3% — S33

Providing a plywood and a backboard, and forming a first adhesive coating and a second adhesive coating on two opposite surfaces of the plywood respectively — S34

Laying the inorganic board on the surface of the first adhesive coating away from the plywood, and laying the backboard on the surface of the second adhesive coating away from the plywood — S35

Performing a first cold pressing at a pressure of 5kg/cm² to 7kg/cm² — S36

Performing a first hot pressing at a pressure of 8kg/cm² to 13kg/cm² and a temperature of 115C° to 125C°, so that the first adhesive coating forms a first adhesive layer and the second adhesive coating forms a second adhesive layer; Wherein, before the first hot pressing, the moisture content of the backboard is higher than the moisture content of the inorganic board — S37

FIG. 14

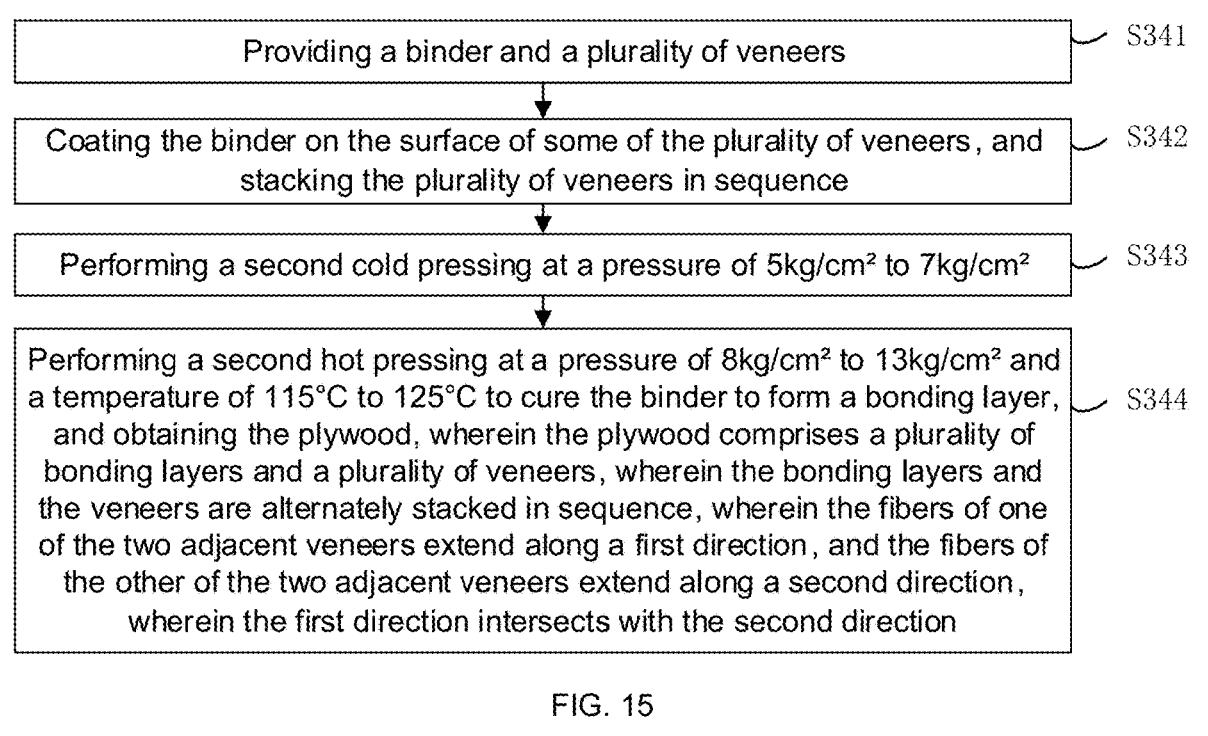

| | |
|---|---|
| Providing a binder and a plurality of veneers | S341 |

↓

| | |
|---|---|
| Coating the binder on the surface of some of the plurality of veneers, and stacking the plurality of veneers in sequence | S342 |

↓

| | |
|---|---|
| Performing a second cold pressing at a pressure of 5kg/cm² to 7kg/cm² | S343 |

↓

| | |
|---|---|
| Performing a second hot pressing at a pressure of 8kg/cm² to 13kg/cm² and a temperature of 115°C to 125°C to cure the binder to form a bonding layer, and obtaining the plywood, wherein the plywood comprises a plurality of bonding layers and a plurality of veneers, wherein the bonding layers and the veneers are alternately stacked in sequence, wherein the fibers of one of the two adjacent veneers extend along a first direction, and the fibers of the other of the two adjacent veneers extend along a second direction, wherein the first direction intersects with the second direction | S344 |

FIG. 15

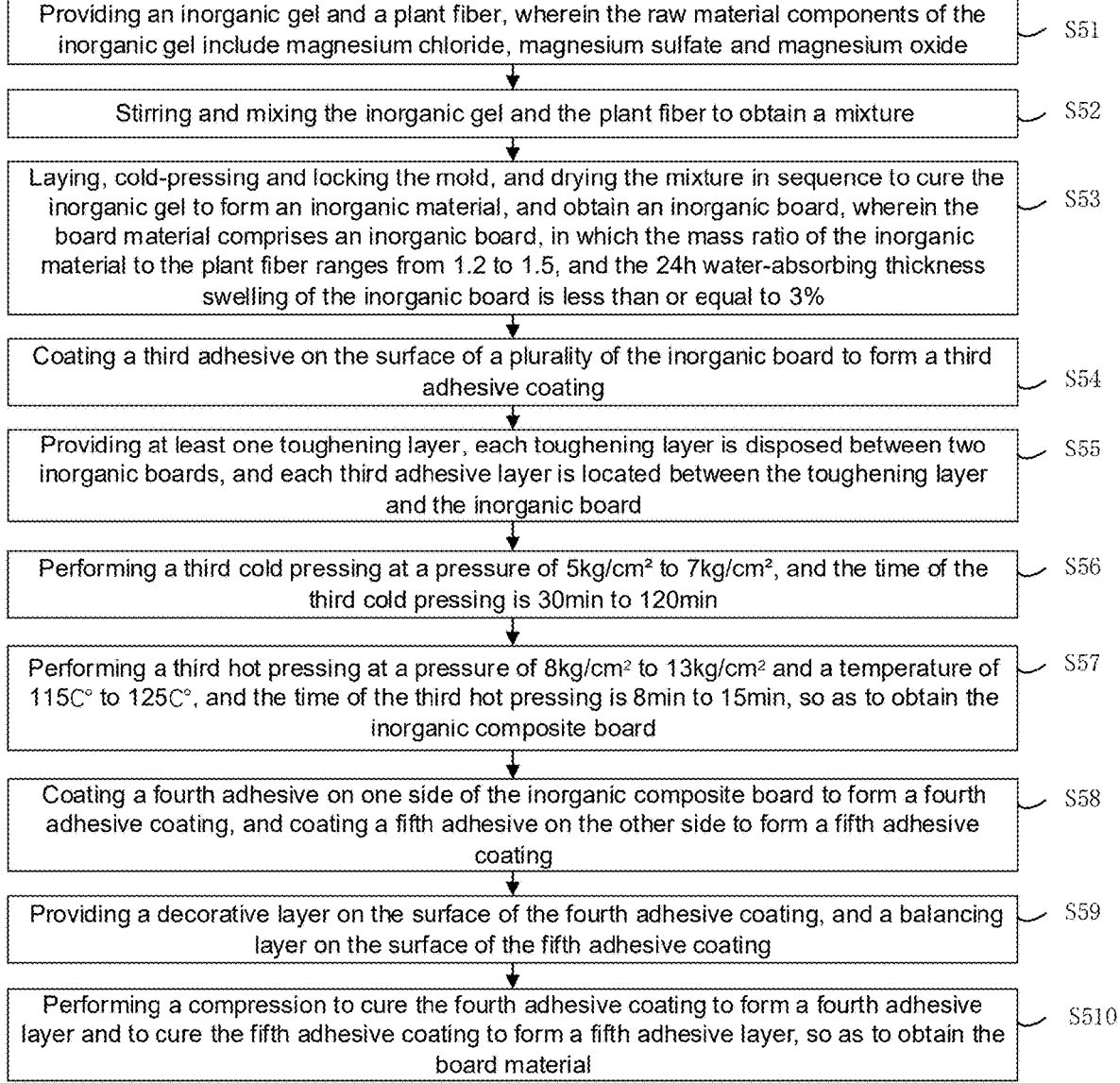

Providing an inorganic gel and a plant fiber, wherein the raw material components of the inorganic gel include magnesium chloride, magnesium sulfate and magnesium oxide ⟶ S51

Stirring and mixing the inorganic gel and the plant fiber to obtain a mixture ⟶ S52

Laying, cold-pressing and locking the mold, and drying the mixture in sequence to cure the inorganic gel to form an inorganic material, and obtain an inorganic board, wherein the board material comprises an inorganic board, in which the mass ratio of the inorganic material to the plant fiber ranges from 1.2 to 1.5, and the 24h water-absorbing thickness swelling of the inorganic board is less than or equal to 3% ⟶ S53

Coating a third adhesive on the surface of a plurality of the inorganic board to form a third adhesive coating ⟶ S54

Providing at least one toughening layer, each toughening layer is disposed between two inorganic boards, and each third adhesive layer is located between the toughening layer and the inorganic board ⟶ S55

Performing a third cold pressing at a pressure of 5kg/cm² to 7kg/cm², and the time of the third cold pressing is 30min to 120min ⟶ S56

Performing a third hot pressing at a pressure of 8kg/cm² to 13kg/cm² and a temperature of 115C° to 125C°, and the time of the third hot pressing is 8min to 15min, so as to obtain the inorganic composite board ⟶ S57

Coating a fourth adhesive on one side of the inorganic composite board to form a fourth adhesive coating, and coating a fifth adhesive on the other side to form a fifth adhesive coating ⟶ S58

Providing a decorative layer on the surface of the fourth adhesive coating, and a balancing layer on the surface of the fifth adhesive coating ⟶ S59

Performing a compression to cure the fourth adhesive coating to form a fourth adhesive layer and to cure the fifth adhesive coating to form a fifth adhesive layer, so as to obtain the board material ⟶ S510

FIG. 17

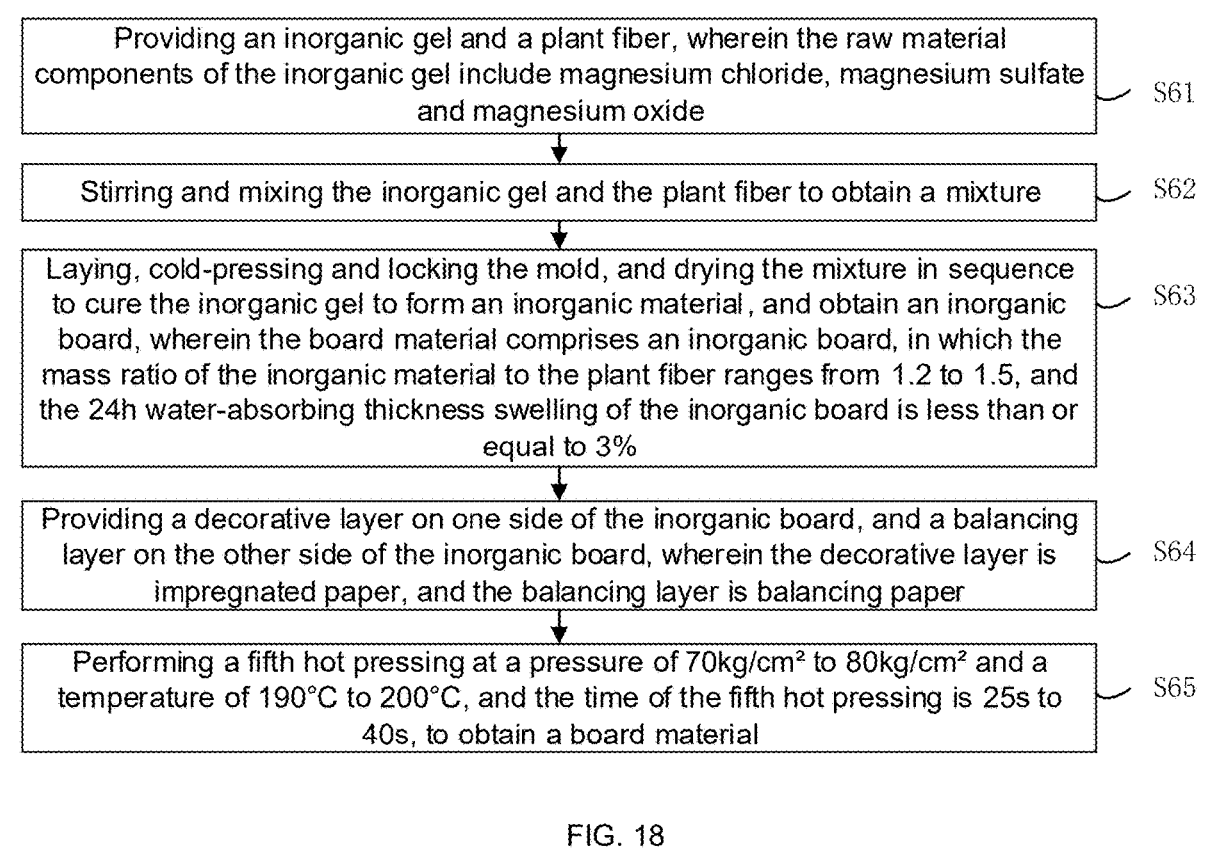

Providing an inorganic gel and a plant fiber, wherein the raw material components of the inorganic gel include magnesium chloride, magnesium sulfate and magnesium oxide — S61

Stirring and mixing the inorganic gel and the plant fiber to obtain a mixture — S62

Laying, cold-pressing and locking the mold, and drying the mixture in sequence to cure the inorganic gel to form an inorganic material, and obtain an inorganic board, wherein the board material comprises an inorganic board, in which the mass ratio of the inorganic material to the plant fiber ranges from 1.2 to 1.5, and the 24h water-absorbing thickness swelling of the inorganic board is less than or equal to 3% — S63

Providing a decorative layer on one side of the inorganic board, and a balancing layer on the other side of the inorganic board, wherein the decorative layer is impregnated paper, and the balancing layer is balancing paper — S64

Performing a fifth hot pressing at a pressure of 70kg/cm² to 80kg/cm² and a temperature of 190°C to 200°C, and the time of the fifth hot pressing is 25s to 40s, to obtain a board material — S65

FIG. 18

BOARD MATERIAL AND A PREPARATION METHOD THEREOF

CROSS-REFERENCE TO RELATED APPLICATIONS

This application claims priority to Chinese Patent Application No. 202411080869.1, filed on Aug. 8, 2024, the entire disclosure of which is hereby incorporated by reference.

FIELD OF THE INVENTION

The present disclosure relates to the field of decoration materials, and specifically to a board material and a preparation method thereof.

BACKGROUND OF THE INVENTION

The existing household or commercial flooring has increasingly high requirements for moisture and water resistance of the boards, but the moisture and water resistance of the existing boards are still relatively low, making it difficult to meet the requirements of various application scenarios.

SUMMARY OF THE INVENTION

The embodiment of the present disclosure provides a board material having a good moisture-proof and waterproof performance, and having a low water-absorbing thickness swelling.

In the first aspect, the embodiment of the present disclosure provides a board material, the board material includes:

an inorganic board, the inorganic board includes a plant fiber and an inorganic material, in which the mass ratio of the inorganic material to the plant fiber is in the range of 1.2 to 1.5; the raw material components of the inorganic material include a magnesium sulfate and a magnesium oxide, the mass ratio of the magnesium sulfate to the magnesium oxide is in the range of 0.4 to 0.5; the raw material components of the inorganic material further include a magnesium chloride and a modifier, the mass ratio of magnesium chloride to magnesium oxide is in the range of 0.05 to 0.15; the modifier is citric acid; in the raw material components of the inorganic material, the mass ratio of the modifier to the magnesium chloride is in the range of 0.025 to 0.045; the 24 h water-absorbing thickness swelling of the inorganic board is less than or equal to 3%.

In some embodiments, the raw material components of the inorganic material include: 2% to 6% magnesium chloride, based on the total weight of the raw material components of the inorganic material, 17% to 23% magnesium sulfate, based on the total weight of the raw material components of the inorganic material; and 40% to 48% magnesium oxide, based on the total weight of the raw material components of the inorganic material.

In some embodiments, before the citric acid is added, the citric acid is mixed with some magnesium sulfate to form a mixed solution, so that the mass ratio of the citric acid to the magnesium sulfate in the mixed solution ranges from 20 to 66.

In some embodiments, the raw material components of the inorganic material include the following components in parts by weight:

12 to 16 parts of magnesium chloride;
68 to 75 parts of magnesium sulfate;
150 to 170 parts of magnesium oxide;

0.3 to 1.2 parts of modifier; and
110 to 120 parts of water.

In some embodiments, the density p of the inorganic board ranges from 1 g/cm³≤ρ≤1.5 g/cm³; the 2 h water-absorbing thickness swelling of the inorganic board is less than or equal to 2%; the fire rating of the inorganic board is A2.

In some embodiments, the board material further includes:

A first adhesive layer, the first adhesive layer is arranged on the surface of the inorganic board;

A plywood, the plywood is arranged on the surface of the first adhesive layer away from the inorganic board;

A second adhesive layer, the second adhesive layer is arranged on the surface of the plywood away from the first adhesive layer; and A backboard, the backboard is arranged on the surface of the second adhesive layer away from the inorganic board.

In some embodiments, the plywood includes a plurality of bonding layers and a plurality of veneers, the bonding layers and the veneers are alternately stacked in sequence, the fibers of one of the two adjacent veneers extend along a first direction, and the fibers of the other extend along a second direction, the first direction intersects with the second direction.

In some embodiments, the number of the inorganic boards is multiple layers, the board material further includes at least one toughening layer, the inorganic boards and the toughening layers are alternately stacked in sequence to form an inorganic composite board, and the toughening layer is thin veneer or non-woven fabric.

In some embodiments, the board material further includes:

A decorative layer, the decorative layer is arranged on one side of the inorganic board; and A balancing layer, the balancing layer is arranged on the other side of the inorganic board.

In the second aspect, the embodiment of the present disclosure provides a method for preparing a board material, the method includes:

Providing an inorganic gel and a plant fiber, the raw material components of the inorganic gel include a magnesium sulfate and a magnesium oxide, and the mass ratio of the magnesium sulfate to the magnesium oxide ranges from 0.4 to 0.5; the raw material components of the inorganic gel further include a magnesium chloride and a modifier, the mass ratio of magnesium chloride to magnesium oxide is in the range of 0.05 to 0.15; the modifier is citric acid; in the raw material components of the inorganic material, the mass ratio of the modifier to the magnesium chloride is in the range of 0.025 to 0.045;

Stirring and mixing the inorganic gel and the plant fiber to obtain a mixture; and Laying, cold-pressing and locking the mold, and drying the mixture in sequence to cure the inorganic gel to form an inorganic material, and obtain an inorganic board, the board material includes an inorganic board, in which the mass ratio of the inorganic material to the plant fiber ranges from 1.2 to 1.5, and the 24 h water-absorbing thickness swelling of the inorganic board is less than or equal to 3%.

In some embodiments, the providing the inorganic gel includes:

Dissolving the magnesium chloride in water at room temperature;

Adding the magnesium sulfate and stirring at room temperature until the magnesium sulfate is completely dissolved; and Adding the magnesium oxide and the modifier, and stirring at room temperature to react the magnesium chloride, the magnesium sulfate and the magnesium oxide to obtain the inorganic gel;

The providing the plant fiber includes:

Crushing the plant fiber raw material to obtain the plant fiber, the size of the plant fiber ranges from 1.5 mm to 2.0 mm.

In some embodiments, the laying, cold-pressing and locking the mold, and drying the mixture in sequence to cure the inorganic gel to form an inorganic material, and obtain an inorganic board, includes:

Laying the mixture on a pad to obtain a blank, and stacking multiple blanks in sequence;

Cold-pressing and mold-locking the stacked multiple blanks to obtain a blank stack; and Drying the blank stack at a temperature of 125° C. to 145° C. to obtain the inorganic board.

In some embodiments, the drying the blank stack at a temperature of 125° C. to 145° C. to obtain the inorganic board, includes:

Setting a mold temperature machine so that the preset outlet temperature of the mold temperature machine is 160° C. to 180° C. and the preset reflux temperature of the mold temperature machine is 125° C. to 145° C.;

When the reflux temperature of the mold temperature machine reaches the preset reflux temperature, placing the blank stack in the mold temperature machine;

In a first period, turning on the mold temperature machine every a first term, the first period includes a plurality of the first terms;

In a second period, turning on the mold temperature machine every a second term, the second period includes a plurality of second terms, the second term is longer than the first term, and the second period is after the first period; and When the reflux temperature is higher than the preset reflux temperature by 2° C. to 5° C., turning on the mold temperature machine to obtain the inorganic board.

In some embodiments, the method further includes:

Providing a plywood and a backboard, and forming a first adhesive coating and a second adhesive coating on two opposite surfaces of the plywood respectively;

Laying the inorganic board on the surface of the first adhesive coating away from the plywood, and laying the backboard on the surface of the second adhesive coating away from the plywood;

Performing a first cold pressing at a pressure of 5 kg/cm$^2$ to 7 kg/cm$^2$; and Performing a first hot pressing at a pressure of 8 kg/cm$^2$ to 13 kg/cm$^2$ and a temperature of 115 C.° to 125 C.°, so that the first adhesive coating forms a first adhesive layer and the second adhesive coating forms a second adhesive layer; before the first hot pressing, the moisture content of the backboard is higher than the moisture content of the inorganic board.

In some embodiments, before the first hot pressing, the moisture content of the backboard is higher than that of the plywood, and the moisture content of the plywood is higher than that of the inorganic board; the moisture content of the backboard is in the range of 12% to 20%; the moisture content of the plywood is in the range of 10% to 12%; and the moisture content of the inorganic board is in the range of 4% to 7%.

In some embodiments, providing the plywood includes:

Providing a binder and a plurality of veneers;

Coating the binder on the surface of some of the plurality of veneers, and stacking the plurality of veneers in sequence;

Performing a second cold pressing at a pressure of 5 kg/cm$^2$ to 7 kg/cm$^2$; and Performing a second hot pressing at a pressure of 8 kg/cm$^2$ to 13 kg/cm$^2$ and a temperature of 115° C. to 125° C. to cure the binder to form a bonding layer, and obtaining the plywood, the plywood includes a plurality of bonding layers and a plurality of veneers, the bonding layers and the veneers are alternately stacked in sequence, the fibers of one of the two adjacent veneers extend along a first direction, and the fibers of the other of the two adjacent veneers extend along a second direction, the first direction intersects with the second direction.

The board material of the embodiment of the present disclosure includes an inorganic board, the inorganic board includes a plant fiber and an inorganic material, in which the mass ratio of the inorganic material to the plant fiber is in the range of 1.2 to 1.5; the raw material components of the inorganic material include a magnesium chloride, a magnesium sulfate, and a magnesium oxide, the 24 h water-absorbing thickness swelling of the inorganic board is less than or equal to 3%. In the embodiment of the present disclosure, the inorganic material is added to the inorganic board, and the inorganic board has a lower 24 h water-absorbing thickness swelling through the design of the inorganic material components and the ratio of the inorganic material to the plant fiber; in addition, the board material of the present disclosure includes an inorganic board, which is made by pressing and has a higher flatness, so that when a decorative layer is attached to the surface of the inorganic board, it has a higher yield, improves the preparation yield of the board material, and reduces the preparation cost of the board material; furthermore, the inorganic board can be used as the surface plate of the board material, and when the inorganic board is used as the surface plate, the defect requirements for the Veneer under the surface plate are reduced, and the cost of the board material can be better reduced while ensuring that the performance of the board material remains unchanged. In addition, the plant fiber and inorganic material of the present disclosure are environmentally friendly compounds, which make the inorganic board 10 non-toxic, harmless, and biodegradable, making it an ideal choice for producing green building materials.

BRIEF DESCRIPTION OF THE DRAWINGS

To describe the technical solutions of the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

FIG. 1 is a planar schematic diagram of a board material according to an embodiment of the present disclosure.

FIG. 2 is a schematic cross-sectional structural diagram of a board material along a line A-A in FIG. 1 according to the first embodiment of the present disclosure.

FIG. 3 is a schematic cross-sectional structural diagram of a board material along a line A-A in FIG. 1 according to the second embodiment of the present disclosure.

FIG. 4 is a schematic cross-sectional structural diagram of plywood along a line A-A in FIG. 1 according to the second embodiment of the present disclosure.

FIG. 5 is a schematic cross-sectional structural diagram of a board material along a line A-A in FIG. 1 according to the third embodiment of the present disclosure.

FIG. 6 is a schematic cross-sectional structural diagram of a board material along a line A-A in FIG. 1 according to the fourth embodiment of the present disclosure.

FIG. 10 is a schematic diagram of the flow chart of the method for preparing the board material according to the first embodiment of the present disclosure.

FIG. 11 is a schematic diagram of the flow chart of the method for preparing the inorganic gel according to an embodiment of the present disclosure.

FIG. 12 is a schematic diagram of the flow chart of the method for preparing the board material according to the second embodiment of the present disclosure.

FIG. 13 is a schematic diagram of the flow chart of drying in the method for preparing the board material according to an embodiment of the present disclosure.

FIG. 14 is a schematic diagram of the flow chart of the method for preparing the board material according to the third embodiment of the present disclosure.

FIG. 15 is a schematic diagram of the flow chart of the method for preparing the plywood according to an embodiment of the present disclosure.

FIG. 17 is a schematic diagram of the flow chart of the method for preparing the board material according to the fifth embodiment of the present disclosure.

FIG. 18 is a schematic diagram of the flow chart of the method for preparing the board material according to the sixth embodiment of the present disclosure.

Figure 7:
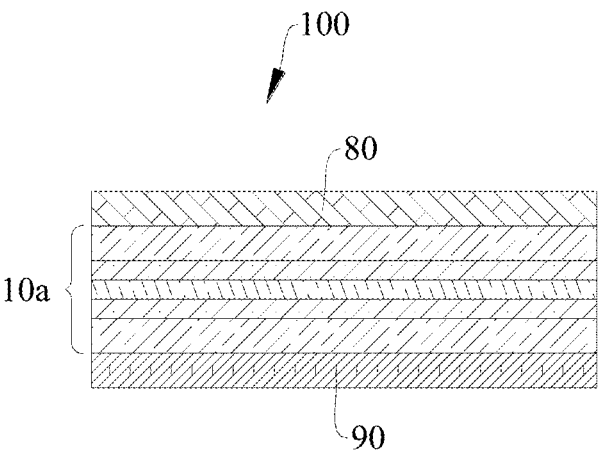
FIG. 7 is a schematic cross-sectional structural diagram of plywood along a line A-A in FIG. 1 according to the fifth embodiment of the present disclosure.

DESCRIPTIONS OF REFERENTIAL
NUMERALS

100—board material, 10—inorganic board, 10a—inorganic composite board, 20—first adhesive layer, 30—plywood, 31—bonding layer, 32—veneer, 40—second adhesive layer, 50—backboard, 60—toughening layer, 70—third adhesive layer, 80—decorative layer, 90—balancing layer, 91—fourth adhesive layer, 92—fifth adhesive layer.

DETAILED DESCRIPTION

To enable a person skilled in the art to better understand the solutions of the present disclosure, the technical solutions in embodiments of the present disclosure are clearly and completely described in the following with reference to the accompanying drawings in the embodiments of the present disclosure. Apparently, merely the described embodiments are merely some rather than all of the embodiments of the present disclosure. All other embodiments obtained by a person of ordinary skill in the art based on the embodiments of the present disclosure without making creative efforts shall fall within the protection scope of the present disclosure.

In the specification, the claims, and the accompanying drawings of the present disclosure, the terms "first", "second", and the like are intended to distinguish between different objects, but do not indicate a particular order thereof. Moreover, the terms "include", "contain" and any other variants mean to cover the non-exclusive inclusion, for example, a process, method, system, product, or device that includes a list of steps or units is not limited to those listed steps or units, but may optionally include other steps or units not listed, or may optionally include other steps or units inherent to such a process, method, system, product, or device.

The following describes the technical solutions of the embodiments in the present disclosure with reference to the accompanying drawings.

It should be noted that, for ease of description, in the embodiments of the present disclosure, the same referential numerals represent the same components, and for brevity, detailed descriptions of the same components in different embodiments are omitted.

The existing household or commercial flooring has increasingly high requirements for moisture and water resistance of the boards, but the moisture and water resistance of the existing boards are still relatively low, making it difficult to meet the requirements of various application scenarios.

In related technical, the substrate used for the engineered wood flooring is usually multi-layer plywood, and the main raw materials are *Eucalyptus* veneer, poplar veneer or miscellaneous wood veneer. When pasting 0.6 mm veneer, the quality requirements for the surface veneer (referred to as the surface plate) and the two layers of veneer under the surface are relatively high. The surface plate is generally required to be a whole beech veneer, no dead knots, no cracks, no repairs allowed, and a smooth surface. The two layers of veneers under the surface sheet are required to have no overlapping cores, no cracks, and repairs are smooth. Otherwise, after the decorative layer is pasted, the quality defects of the veneer under the surface sheet may cause some quality problems on the surface of the floor (such as the surface of the floor or one surface of the decorative layer or the balance layer), such as bulging, bubbling, stripe printing, or the like.

As illustrated in FIG. 1 and FIG. 2, the embodiments of the present disclosure provide a board material 100, the board material 100 includes an inorganic board 10, the inorganic board 10 includes a plant fiber and an inorganic material, in which the mass ratio of the inorganic material to the plant fiber is in the range of 1.2 to 1.5; the raw material components of the inorganic material include a magnesium sulfate ($MgSO_4$) and a magnesium oxide (MgO), the mass ratio of the magnesium sulfate to the magnesium oxide is in the range of 0.4 to 0.5; the 24 h water-absorbing thickness swelling of the inorganic board 10 is less than or equal to 3%.

The board material 100 of the embodiment of the present disclosure can be applied to home or commercial floor, wall board, furniture board and other decoration board.

It should be noted that the board material 100 of the present disclosure can only includes the inorganic board 10.

In addition to the inorganic board 10, the board material 100 of the present disclosure further includes other wood veneers, or the like.

Optionally, the plant fiber may be, but is not limited to, at least one of wood fiber (such as wood powder), straw fiber (such as straw powder), or the like. Straw fibers may include but are not limited to plant straws such as rice straw, wheat straw, and reed straw.

Specifically, the mass ratio of the inorganic material to the plant fiber may be, but is not limited to, 1.2, 1.23, 1.25, 1.28, 1.3, 1.33, 1.35, 1.38, 1.4, 1.44, 1.45, 1.48, 1.5, or the like. If the mass ratio of the inorganic material to the plant fiber is excessively small, the amount of inorganic gel added during the preparation of the inorganic board 10 is insufficient, and the plant fiber cannot be well bonded, so that the internal bonding strength of the inorganic board 10 is insufficient, and stratification is prone to occur, which reduces the mechanical strength of the inorganic board 10; if the mass ratio of the inorganic material to the plant fiber is excessively large, the amount of inorganic material in the inorganic board 10 is too much, and the amount of plant fiber is too little, so that the brittleness of the inorganic board 10 is increased, and the impact strength of the inorganic board 10 is reduced. When the mass ratio of the inorganic material to the plant fiber is in the range of 1.2 to 1.5, the inorganic board 10 can have a good internal bonding strength, less prone to delamination, and has high toughness, thereby having a good rigidity and impact strength.

It should be noted that the inorganic material is formed by curing the inorganic gel. The inorganic gel is made of components such as magnesium sulfate ($MgSO_4$) and magnesium oxide (MgO).

In the raw material components of the inorganic material, magnesium sulfate can improve the water resistance and compressive strength of the inorganic board 10. Magnesium oxide can improve the mechanical strength of the inorganic board 10. Through the compounding of magnesium sulfate and magnesium oxide, the inorganic gel can be better bonded to the plant fiber, and the inorganic board 10 has a better water resistance, compressive strength, impact strength and other mechanical strength.

It can be understood that the mass ratio of the magnesium sulfate to the magnesium oxide in the raw material components of the inorganic gel range from 0.4 to 0.5.

Specifically, the mass ratio of the magnesium sulfate to the magnesium oxide in the raw material components of the inorganic gel may be, but is not limited to, 0.4, 0.41, 0.42, 0.43, 0.44, 0.45, 0.46, 0.47, 0.48, 0.49, 0.5, or the like. If the mass ratio of the magnesium sulfate to the magnesium oxide is too low, the content of the magnesium sulfate is too low and the content of the magnesium oxide is too high; if the content of the magnesium sulfate is too low, the water resistance and compressive strength of the inorganic board 10 are reduced; if the content of the magnesium oxide is too high, when the magnesium oxide is hydrated, more magnesium hydroxide ($Mg(OH)_2$ colloid) colloid will be formed in a short time, which increases the alkalinity of the inorganic gel and aggravates the moisture absorption and halogen return of the inorganic board 10. If the mass ratio of the magnesium sulfate to the magnesium oxide is too high, the content of magnesium sulfate is too high and the content of magnesium oxide is too low; if the content of magnesium sulfate is too high, the strength of the inorganic board 10 will be reduced, the inorganic board 10 will be brittle, and the impact strength will be reduced, which is not conducive to the application of the inorganic board 10; if the content of magnesium oxide is too low, the magnesium oxychloride gel formed in the inorganic gel will be less. In addition, magnesium chloride will be excessive, and chloride ions will exist in the inorganic board 10 in a free form, making the inorganic board 10 easy to absorb moisture and return to halogen or absorb moisture, thereby reducing the moisture resistance of the inorganic board 10.

Specifically, 24 h water-absorbing thickness swelling of the inorganic board 10 can be, but not limited to, less than or equal to 3%, less than or equal to 2.8%, less than or equal to 2.6%, less than or equal to 2.4%, less than or equal to 2.2%, less than or equal to 2.0%, less than or equal to 1.8%, or the like. For example, the 24 h water-absorbing thickness swelling of the inorganic board 10 may be, but is not limited to, 3%, 2.8%, 2.6%, 2.4%, 2.2%, 2.0%, 1.8%, 1.5%, or the like. The inorganic board 10 of the embodiment of the present disclosure has a lower 24 h water-absorbing thickness swelling and has good moisture-proof and waterproof performance.

The board material 100 of the embodiment of the present disclosure includes an inorganic board 10, the inorganic board 10 includes a plant fiber and an inorganic material, in which the mass ratio of the inorganic material to the plant fiber is in the range of 1.2 to 1.5; the raw material components of the inorganic material include a magnesium sulfate, and a magnesium oxide, the 24 h water-absorbing thickness swelling of the inorganic board 10 is less than or equal to 3%. In the embodiment of the present disclosure, the inorganic material is added to the inorganic board 10, and the inorganic board 10 has a lower 24 h water-absorbing thickness swelling through the design of the inorganic material components and the ratio of the inorganic material to the plant fiber; in addition, the board material 100 of the present disclosure includes an inorganic board, which is prepared by pressing and has a higher flatness, so that when a decorative layer is attached to the surface of the inorganic board 10, it has a higher yield, improves the preparation yield of the board material 100, and reduces the preparation cost of the board material 100; furthermore, the inorganic board 10 can be used as the surface plate of the board material 100, and when the inorganic board 10 is used as the surface plate, the defect requirements for the Veneer under the surface plate are reduced, and the cost of the board material 100 can be better reduced while ensuring that the performance of the board material 100 remains unchanged. In addition, the plant fiber and inorganic material of the present disclosure are environmentally friendly compounds, which make the inorganic board 10 non-toxic, harmless, and biodegradable, making it an ideal choice for producing green building materials.

In some embodiments, the raw material components of the inorganic material further include magnesium chloride ($MgCl_2$). Magnesium chloride can increase the adhesion of inorganic gel, thereby improving the bonding strength between the inorganic gel and the plant fiber; in addition, magnesium chloride can enhance the water resistance of the inorganic board 10, making it less prone to deformation or decay; furthermore, the addition of magnesium chloride in the inorganic gel can promote the curing speed of the inorganic gel, thereby improving the surface hardness of the inorganic board 10.

In some embodiments, in the raw material components of the inorganic material, the mass ratio of magnesium chloride to magnesium oxide ranges from 0.05 to 0.15. In other words, in the raw material components of the inorganic gel, the mass ratio of magnesium chloride to magnesium oxide ranges from 0.05 to 0.15.

Specifically, in the raw material components of the inorganic material, the mass ratio of magnesium chloride to magnesium oxide may be, but is not limited to, 0.05, 0.06, 0.07, 0.08, 0.09, 0.10, 0.11, 0.12, 0.13, 0.14, 0.15, or the like. If the mass ratio of magnesium chloride to magnesium oxide in the raw material components of the inorganic material is excessively small, the content of magnesium chloride in the raw material components of the inorganic material will be too low and the content of magnesium oxide will be too high; if the content of magnesium chloride is too low, the bonding strength of the inorganic gel will be reduced, thereby reducing the bonding force between the inorganic gel and the plant fiber, which is not conducive to improving the hardness and mechanical strength of the inorganic board 10; if the content of magnesium oxide is too high, more magnesium hydroxide ($Mg(OH)_2$ colloid) colloid will be formed in a short time during the hydration of magnesium oxide, thereby increasing the alkalinity of the inorganic gel, preventing the normal progress of the magnesium oxychloride gel, and causing the magnesium chloride to exist in the form of $MgCl_2 \cdot 6H_2O$, which will also aggravate the moisture absorption and halogen return of the inorganic board 10. If the mass ratio of magnesium chloride to magnesium oxide in the raw material components of the inorganic material is excessively large, the content of magnesium chloride in the raw material components of the inorganic material is too high and the content of magnesium oxide is too low; if the content of magnesium chloride is too high, the inorganic board 10 will be prone to deformation and cracking; if the content of magnesium oxide is too low, the magnesium oxychloride gel formed in the inorganic gel will be less. In addition, magnesium chloride will be excessive, and chloride ions will exist in the inorganic board 10 in a free form, making the inorganic board 10 easy to absorb moisture and return to halogen or absorb moisture, thereby reducing the moisture resistance of the inorganic board 10.

In some embodiments, the raw material components of the inorganic material include: 2% to 6% magnesium chloride, based on the total weight of the raw material components of the inorganic material, 17% to 23% magnesium sulfate, based on the total weight of the raw material components of the inorganic material; and 40% to 48% magnesium oxide, based on the total weight of the raw material components of the inorganic material, and the remainder is water. In other words, the raw material components of the inorganic gel include, by mass fraction: 2% to 6% of magnesium chloride, 17% to 23% of magnesium sulfate, and 40% to 48% of magnesium oxide, and the remainder is water.

Specifically, in the raw material components of the inorganic material, the mass fraction of the magnesium chloride may be, but is not limited to, 2%, 2.5%, 3%, 3.5%, 4%, 4.5%, 5%, 5.5%, 6%, or the like. In the raw material components of the inorganic material, if the mass fraction of the magnesium chloride is too low, the bonding strength of the inorganic gel is reduced, thereby reducing the bonding force between the inorganic gel and the plant fiber, which is not conducive to improving the hardness and mechanical strength of the inorganic board 10; in the raw material components of the inorganic material, if the mass fraction of the magnesium chloride is too high, the inorganic board 10 is prone to deformation and cracking, thereby reducing the preparation yield of the inorganic board 10. When the mass fraction of the magnesium chloride in the raw material components of the inorganic material is in the range of 2% to 6%, the inorganic board 10 can have higher hardness and mechanical strength, and less prone to cracking.

Further, in the raw material components of the inorganic material, the mass fraction of the magnesium chloride is in the range of 2% to 4%. This can make the inorganic board 10 have higher hardness and mechanical strength, and less prone to cracking.

Specifically, in the raw material components of the inorganic material, the mass fraction of the magnesium sulfate may be, but is not limited to, 17%, 17.5%, 18%, 18.5%, 19%, 19.5%, 20%, 20.5%, 21%, 21.5%, 22%, 22.5%, 23%, or the like. If the mass fraction of the magnesium sulfate is too low in the raw material components of the inorganic material, the water resistance and compressive strength of the inorganic board 10 are reduced; if the mass fraction of the magnesium sulfate in the raw material components of the inorganic material is too high, the strength of the inorganic board 10 is reduced, the inorganic board 10 becomes brittle, and the impact strength is reduced, which is not conducive to the application of the inorganic board 10. When the mass fraction of the magnesium sulfate in the raw material components of the inorganic material is 17% to 23%, the inorganic board 10 can have better water resistance, compressive strength and impact strength.

Further, in the raw material components of the inorganic material, the mass fraction of the magnesium sulfate is 18% to 20%. This can make the inorganic board 10 have better water resistance, compressive strength and impact resistance.

Specifically, in the raw material components of the inorganic material, the mass fraction of the magnesium oxide may be, but is not limited to, 40%, 41%, 42%, 43%, 44%, 45%, 46%, 47%, 48%, or the like. If the content of magnesium oxide in the raw material components of the inorganic material is too low, the magnesium oxychloride gel formed in the inorganic gel will be less, and in addition, magnesium chloride will be excessive, and chloride ions will exist in the inorganic board 10 in a free form, making the inorganic board 10 easy to absorb moisture and return to halogen or absorb moisture, thereby reducing the moisture resistance of the inorganic board 10; If the content of magnesium oxide in the raw material components of the inorganic material is too high, when magnesium oxide is hydrated, more magnesium hydroxide ($Mg(OH)_2$ colloid) colloid will be formed in a short time, which will increase the alkalinity of the inorganic gel, prevent the normal progress of the magnesium oxychloride gel material, and make the magnesium chloride exist in the form of $MgCl_2.6H_2O$, which will also aggravate the moisture absorption and return to halogen of the inorganic board 10. When the mass fraction of the magnesium oxide in the raw material components of the inorganic material is 40% to 48%, the inorganic board 10 can have better moisture-proof and waterproof performance, and can better avoid moisture absorption and halogen return of the inorganic board 10.

Further, the mass fraction of the magnesium oxide in the raw material components of the inorganic material is 42% to 44%. This will make the inorganic board 10 have better moisture-proof and waterproof performance, and can better avoid t moisture absorption and halogen return of the inorganic board 10.

In a specific embodiment, the raw material components of the inorganic material includes: 2% to 4% magnesium chloride, 18% to 20% magnesium sulfate and 42% to 44% magnesium oxide by mass fraction. In this way, the inorganic board 10 has better moisture-proof and waterproof performance, and has higher water resistance, compressive strength and impact strength.

In some embodiments, the raw material components of the inorganic material further include a modifier, and the modifier is citric acid; in the raw material components of the inorganic material, the mass ratio of the modifier to the magnesium chloride ranges from 0.025 to 0.045.

Specifically, the mass ratio of the modifier to the magnesium chloride in the raw material components of the inorganic material may be, but is not limited to, 0.025, 0.028, 0.030, 0.033, 0.035, 0.038, 0.040, 0.043, 0.045, or the like. If the mass ratio of the modifier to the magnesium chloride in the raw material components of the inorganic material is excessively small, the content of the modifier is too low, the reaction degree of magnesium chloride is limited, and the moisture absorption and halogen return of the inorganic board 10 is reduced; if the mass ratio of the modifier to the magnesium chloride is excessively large, the content of the modifier is too high, and the thermal stability of the inorganic gel will be reduced.

In this embodiment, by adding the modifier to the raw material components of the inorganic material, the modifier can improve the reaction degree of magnesium chloride in the raw material components of the inorganic material, allow magnesium chloride to react more fully with magnesium sulfate and magnesium oxide, reduce the content of the free chloride ions, and better reduce the moisture absorption and halogen return of the inorganic board 10.

In some embodiments, before the citric acid is added, the citric acid is mixed with some magnesium sulfate to form a mixed solution, so that the mass ratio of the citric acid to the magnesium sulfate in the mixed solution ranges from 20 to 66.

Specifically, the mass ratio of the citric acid to the magnesium sulfate in the mixed solution may be, but is not limited to, 20, 25, 30, 35, 40, 45, 50, 55, 60, 63, 66, or the like. If the mass ratio of the citric acid to the magnesium sulfate is too high, the content of the citric acid is too high, which will reduce the reaction rate of the modifier; if the mass ratio of the citric acid to the magnesium sulfate is too low, the content of the magnesium sulfate is too high, which will reduce the strength of the inorganic board 10.

In some embodiments, the mixed solution includes 30% to 33% citric acid, 0.5% to 1.5% magnesium sulfate, and the balance water by mass fraction. Specifically, the mass fraction of citric acid in the mixed solution may be, but not limited to, 30%, 31%, 32%, 33%, or the like; the mass fraction of magnesium sulfate may be, but not limited to, 0.5%, 0.6%, 0.8%, 1.0%, 1.2%, 1.4%, 1.5%, or the like.

In some embodiments, the raw material components of the inorganic material include the following components in parts by weight:

12 to 16 parts of magnesium chloride;
68 to 75 parts of magnesium sulfate;
150 to 170 parts of magnesium oxide;
0.3 to 1.2 parts of modifier; and
110 to 120 parts of water.

In this embodiment, when the raw material components of the inorganic material include 12 to 16 parts of magnesium chloride; 68 to 75 parts of magnesium sulfate; 150 to 170 parts of magnesium oxide; 0.3 to 1.2 parts of a modifier; and 110 to 120 parts of water, the formed inorganic gel has better bonding properties with the plant fiber, which can better improve the internal bonding strength of the inorganic board 10, making the inorganic board 10 less prone to stratification; in addition, it can better improve the toughness and mechanical strength of the inorganic board 10, making the inorganic board 10 has a good rigidity and a good impact strength.

In a specific embodiment, the raw material components of the inorganic material include, by weight: 14 parts of magnesium chloride, 71.8 parts of magnesium sulfate, 160 parts of magnesium oxide, 0.5 parts of modifier and 116.8 parts of water. When the inorganic gel prepared by this raw material components is used to prepare the inorganic board 10, the inorganic gel can have better bonding properties with the plant fiber, and the internal bonding strength of the inorganic board 10 can be better improved, so that the inorganic board 10 is less prone to delamination; in addition, the toughness and mechanical strength of the inorganic board 10 can be better improved, so that the inorganic board 10 has a good rigidity and good impact strength. In addition, the inorganic board 10 obtained by the ratio of the inorganic material is less prone to have a moisture regurgitation, condensation of water droplets and the like under high temperature and high humidity environment, and has a lower 24 h water-absorbing thickness swelling.

In some embodiments, the density p of the inorganic board 10 ranges from $1 \text{ g/cm}^3 \leq \rho \leq 1.5 \text{ g/cm}^3$. Specifically, the density p of the inorganic board 10 may be, but not limited to, $1.1 \text{ g/cm}^3$, $1.2 \text{ g/cm}^3$, $1.3 \text{ g/cm}^3$, $1.4 \text{ g/cm}^3$, $1.5 \text{ g/cm}^3$, or the like. The inorganic board 10 of the present disclosure has a relatively low density, and the application to the board material 100 can make the board material 100 have a relatively light weight.

Optionally, the fire rating of the inorganic board 10 is A2. The inorganic board 10 of the present disclosure has a relatively high fire rating, so that the board material 100 has a relatively high fireproof property.

Optionally, the 2 h water-absorbing thickness swelling of the inorganic board 10 is less than or equal to 2%. Specifically, the 2 h water-absorbing thickness swelling of the inorganic board 10 may be, but not limited to, 2%, 1.8%, 1.6%, 1.4%, 1.2%, 1.0%, 0.8%, 0.5%, 0.3%, or the like. The inorganic board 10 of the embodiment of the present disclosure has a relatively low 2 h water-absorbing thickness swelling and has relatively good moisture-proof and water-proof properties.

Optionally, the moisture content of the inorganic board 10 is 4% to 7%. Specifically, the moisture content of the inorganic board 10 may be, but is not limited to, 4%, 4.2%, 4.4%, 4.6%, 4.8%, 5%, 5.2%, 5.4%, 5.6%, 5.8%, 6%, 6.2%, 6.4%, 6.6%, 6.8%, 7%, or the like. The inorganic board 10 of the present disclosure has a lower moisture content. When it is used as a surface plate and hot-pressed with other Veneer or composite plates, it is less prone to water loss and shrinkage, so that the obtained board material 100 is less prone to warp to one side.

Optionally, the internal bonding strength of the inorganic board 10 is 1.25 MPa to 1.5 MPa. Specifically, the internal bonding strength of the inorganic board 10 may be, but is not limited to, 1.25 MPa, 1.28 MPa, 1.3 MPa, 1.32 MPa, 1.35 MPa, 1.38 MPa, 1.4 MPa, 1.42 MPa, 1.45 MPa, 1.48 MPa, 1.5 MPa, or the like. The inorganic board 10 of the embodiment of the present disclosure has a higher internal bonding strength, thereby having a higher mechanical strength and hardness, and having a longer service life.

Optionally, the surface bonding strength of the inorganic board 10 is 1.08 MPa to 1.2 MPa. Specifically, the surface bonding strength of the inorganic board 10 may be, but is not limited to, 1.08 MPa, 1.1 MPa, 1.12 MPa, 1.15 MPa, 1.18 MPa, 1.2 MPa, or the like. The inorganic board 10 of the embodiment of the present disclosure has higher surface bonding strength, thereby having a higher mechanical strength and hardness, and having a longer service life.

As illustrated in FIG. 3. In some embodiments, the board material 100 further includes, a first adhesive layer 20, the first adhesive layer 20 is arranged on the surface of the inorganic board 10; a plywood 30, the plywood 30 is arranged on the surface of the first adhesive layer 20 away from the inorganic board 10; a second adhesive layer 40, the second adhesive layer 40 is arranged on the surface of the plywood 30 away from the first adhesive layer 20; and a backboard 50, the backboard 50 is arranged on the surface of the second adhesive layer 40 away from the inorganic board 10.

It can be understood that in this embodiment, the board material 100 includes a backboard 50, a second adhesive layer 40, a plywood 30, a first adhesive layer 20 and an inorganic board 10 stacked in sequence.

Optionally, the first adhesive layer 20 is formed by curing a first adhesive, and the first adhesive includes a melamine modified UF resin and a flour.

Optionally, in the first adhesive, the mass fraction of the flour ranges from 40% to 50%. Specifically, the mass fraction of the flour in the first adhesive may be, but not limited to, 40%, 42%, 44%, 46%, 48%, 50%, or the like. If the mass fraction of the flour in the first adhesive is too low, the leveling property of the first adhesive is insufficient, which reduces the roll-coating property of the first adhesive; if the mass fraction of the flour in the first adhesive is too high, the first adhesive will be too viscous, difficult to apply, and will reduce the adhesive property of the first adhesive.

Optionally, the mass fraction of the melamine modified UF resin in the first adhesive ranges from 50% to 60%. Specifically, the mass fraction of the melamine modified UF resin in the first adhesive may be, but not limited to, 50%, 52%, 55%, 56%, 58%, 60%, or the like. If the mass fraction of the melamine modified UF resin in the first adhesive is excessively low, the first adhesive will be too viscous, difficult to apply, and will reduce the adhesive property of the first adhesive; if the mass fraction of the melamine modified UF resin in the first adhesive is excessively high, the leveling property of the first adhesive is insufficient, and the roll-coating property of the first adhesive is reduced.

Optionally, the second adhesive layer 40 is formed by curing a second adhesive, and the second adhesive includes a melamine modified UF resin and a flour.

Optionally, in the second adhesive, the mass fraction of the flour ranges from 40% to 50%. Specifically, the mass fraction of the flour in the second adhesive may be, but not limited to, 40%, 42%, 44%, 46%, 48%, 50%, or the like. If the mass fraction of the flour in the second adhesive is too low, the leveling property of the second adhesive is insufficient, which reduces the roll-coating property of the second adhesive; if the mass fraction of the flour in the second adhesive is too high, the second adhesive will be too viscous, difficult to apply, and will reduce the adhesive property of the second adhesive.

Optionally, the mass fraction of the melamine modified UF resin in the second adhesive ranges from 50% to 60%. Specifically, the mass fraction of the melamine modified UF resin in the second adhesive may be, but not limited to, 50%, 52%, 55%, 56%, 58%, 60%, or the like. If the mass fraction of the melamine modified UF resin in the second adhesive is excessively low, the second adhesive will be too viscous, difficult to apply, and will reduce the adhesive property of the second adhesive; if the mass fraction of the melamine modified UF resin in the second adhesive is excessively high, the leveling property of the second adhesive is insufficient, and the roll-coating property of the second adhesive is reduced.

Optionally, the backboard 50 may be, but is not limited to, an *Eucalyptus* veneer. In a specific embodiment, the backboard 50 is an *Eucalyptus* veneer with a thickness of 1.7 mm.

When preparing the board material 100 of this embodiment, the inorganic board 10, the first adhesive coating forming the first adhesive layer 20, the plywood 30, the second adhesive coating forming the second adhesive layer 40, and the backboard 50 are sequentially stacked, and after hot pressing, the board material 100 includes the backboard 50, the second adhesive layer 40, the plywood 30, the first adhesive layer 20, and the inorganic board 10 stacked in sequence is obtained. When the inorganic board 10, the first adhesive coating forming the first adhesive layer 20, the plywood 30, the second adhesive coating forming the second adhesive layer 40 and the backboard 50 are combined by hot pressing, there is a phenomenon of water loss shrinkage in the inorganic board 10. Due to the high density of the inorganic board 10, the board material 100 is prone to warping or bending towards one side of the inorganic board 10 after shrinkage. The backboard 50 is arranged on the side of the plywood 30 away from the inorganic board 10, which can balance the tension generated by the shrinkage of the inorganic board 10, so that the board material 100 will be flatter.

As illustrated in FIG. 4. In some embodiments, the plywood 30 includes a plurality of bonding layers 31 and a plurality of veneers 32, the bonding layers 31 and the veneers 32 are alternately stacked in sequence, the fibers of one of the two adjacent veneers 32 extend along a first direction, and the fibers of the other extend along a second direction, the first direction intersects with the second direction. In this embodiment, by arranging the fiber directions of any two adjacent layers of veneers 32 in a crisscross pattern, the plywood 30 is less prone to deformation and bending after hot pressing, and has a higher flatness.

Optionally, the number of the bonding layers 31 may be two, three, four, five, six, or the like. The number of the veneers 32 may be two, three, four, five, six, or the like. The number of bonding layers 31 and veneers 32 is not specifically limited in this applications.

Optionally, the number of bonding layers 31 is one layer less than the number of veneers 32.

Optionally, the veneer 32 may be, but is not limited to, at least one of *Eucalyptus* veneer, poplar veneer or miscellaneous wood veneer. In a specific example, the veneer 32 is a 1.7 mm thick *Eucalyptus* veneer.

In a specific embodiment, the first direction is perpendicular to the second direction.

Optionally, the bonding layer 31 is formed by curing a binder, and the binder includes melamine modified UF resin and flour.

Optionally, the mass fraction of the flour in the binder ranges from 40% to 50%. Specifically, the mass fraction of the flour in the binder may be, but not limited to, 40%, 42%, 44%, 46%, 48%, 50%, or the like. If the mass fraction of the flour in the binder is too low, the leveling property of the binder is insufficient, which reduces the roll-coating property of the binder; if the mass fraction of the flour in the binder is too high, the binder will be too viscous, difficult to apply, and will reduce the adhesive property of the binder.

Optionally, the mass fraction of the melamine modified UF resin in the binder ranges from 50% to 60%. Specifically, the mass fraction of the melamine modified UF resin in the binder may be, but not limited to, 50%, 52%, 55%, 56%, 58%, 60%, or the like. If the mass fraction of the melamine modified UF resin in the binder is excessively low, the binder will be too viscous, difficult to apply, and will reduce the adhesive property of the binder; if the mass fraction of the melamine modified UF resin in the binder is excessively high, the leveling property of the binder is insufficient, and the roll-coating property of the binder is reduced.

Optionally, the plywood 30 includes three bonding layers 31 and four veneers 32, the veneers 32 and the bonding layers 31 are alternately stacked in sequence, and the four veneers 32 are connected as a whole through the three bonding layers 31.

As illustrated in FIG. 5. In some embodiments, the number of inorganic boards 10 is multiple layers, and the board material 100 further includes at least one toughening layer 60. The inorganic boards 10 and the toughening layers 60 are alternately stacked in sequence to form an inorganic composite board 10a. The toughening layer 60 is thin veneer (such as Okoume) or non-woven fabric. In this embodiment, the inorganic composite board 10a is formed by stacking multiple layers of inorganic boards 10, which can better improve the mechanical strength of the board material 100. At the same time, the toughening layer 60 is arranged between two adjacent inorganic boards 10, which can reduce the brittleness of the board material 100 and improve the toughness of the board material 100.

Optionally, the thickness of the toughening layer 60 may be 0.3 mm to 0.5 mm. Specifically, the thickness of the toughening layer 60 may be, but not limited to, 0.3 mm, 0.4 mm, 0.5 mm, or the like.

Optionally, the board material 100 further includes a third adhesive layer 70, which is disposed between the inorganic board 10 and the toughening layer 60, for bonding the inorganic board 10 and the toughening layer 60. In a specific embodiment, the number of inorganic boards 10 in the inorganic composite board 10a is two layers, the number of toughening layers 60 is one layer, and the number of third adhesive layers 70 is two layers. The inorganic composite board 10a includes an inorganic board 10, a third adhesive layer 70, a toughening layer 60, a third adhesive layer 70 and an inorganic board 10 stacked in sequence.

Optionally, the third adhesive layer 70 is formed by curing a third adhesive. The third adhesive includes phenolic resin and flour.

Optionally, in the third adhesive, the mass fraction of the flour ranges from 20% to 28%. Specifically, the mass fraction of the flour in the third adhesive may be, but is not limited to, 20%, 22%, 24%, 26%, 28%, or the like. If the mass fraction of the flour in the third adhesive is too low, the leveling property of the third adhesive is insufficient, and the roll-coating property of the third adhesive is reduced; if the mass fraction of the flour in the third adhesive is too high, the third adhesive is too viscous, not easy to apply, and will reduce the adhesive property of the third adhesive.

Optionally, in the third adhesive, the mass fraction of phenolic resin ranges from 72% to 80%. Specifically, the mass fraction of the phenolic resin in the third adhesive may be, but is not limited to, 72%, 74%, 76%, 78%, or the like. If the mass fraction of the phenolic resin in the third adhesive is too small, the third adhesive is too viscous, not easy to apply, and will reduce the adhesive property of the third adhesive if the mass fraction of the phenolic resin in the third adhesive is too large, the leveling property of the third adhesive is insufficient, and the roll-coating property of the third adhesive is reduced.

As illustrated in FIG. 6 and FIG. 7. In some embodiments, the board material 100 further includes: a decorative layer 80, which is disposed on one side of the inorganic board 10; and a balancing layer 90, which is disposed on the other side of the inorganic board 10. In this embodiment, by disposing the decorative layer 80 on one side of the inorganic board 10 and the balancing layer 90 on the other side of the inorganic board 10, the board material 100 can have better appearance.

It should be noted that "disposed on one side of a layer" in this application can be disposed on the surface of the layer; it can also be disposed opposite and spaced apart from the layer, and there are other layers between it.

It can be understood that the decorative layer 80 and the balancing layer 90 are disposed on opposite sides of the inorganic board 10. The decorative layer 80 and the balancing layer 90 are respectively the outermost layers on opposite sides of the board material 100.

Optionally, the decorative layer 80 may be, but is not limited to, at least one of natural veneer, impregnated paper, luxury vinyl tile (LVT) or polyethylene terephthalate layer (PET).

Optionally, the balancing layer 90 may be, but is not limited to, at least one of thin veneer balancing paper, LVT or PET. Optionally, the thin veneer may be, but is not limited to, natural veneer, technical wood, or the like.

In one embodiment, when the decorative layer 80 is impregnated paper and the balancing layer 90 is balancing paper, the decorative layer 80 and the balancing layer 90 are directly bonded by a hot pressing without the use of an adhesive.

Figure 8:
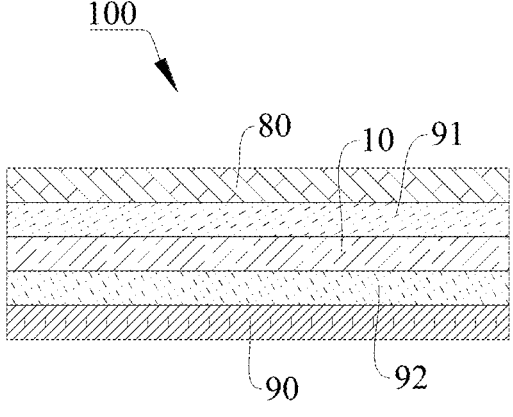
FIG. 8 is a schematic cross-sectional structural diagram of a board material along a line A-A in FIG. 1 according to the sixth embodiment of the present disclosure.
Figure 9:
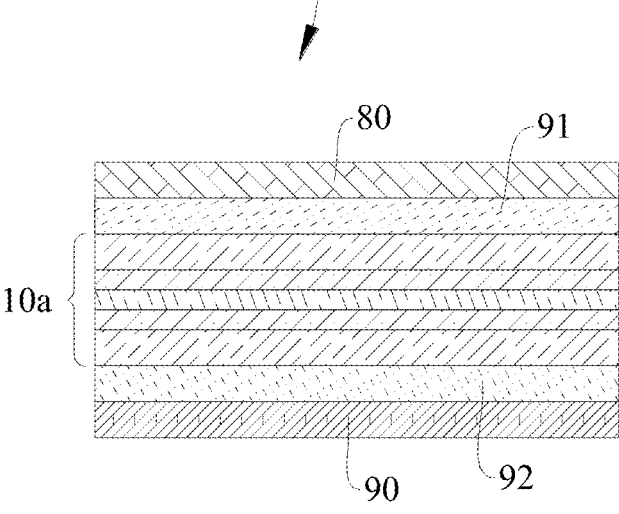
FIG. 9 is a schematic cross-sectional structural diagram of a board material along a line A-A in FIG. 1 according to the seventh embodiment of the present disclosure.

As illustrated in FIG. 8 and FIG. 9. In other embodiments, when the decorative layer 80 is at least one of natural veneer, LVT, and PET, and the balancing layer 90 is at least one of thin veneer, LVT, or PET, the board material 100 further includes a fourth adhesive layer 91 and a fifth adhesive layer 92. The fourth adhesive layer 91 is used to attach the decorative layer 80 to one side of the inorganic board 10 or the inorganic composite board 10a, and the fifth adhesive layer 92 is used to attach the balancing layer 90 to the other side of the inorganic board 10 or the inorganic composite board 10a.

It can be understood that in some embodiments, the board material 100 includes the balancing layer 90, the fifth adhesive layer 92, the inorganic board 10, the fourth adhesive layer 91, and the decorative layer 80 stacked in sequence, as shown in FIG. 8. In other embodiments, the board material 100 includes the balancing layer 90, the fifth adhesive layer 92, the backboard 50, the second adhesive layer 40, the plywood 30, the first adhesive layer 20, the inorganic board 10, the fourth adhesive layer 91, and the decorative layer 80 stacked in sequence. In some other embodiments, the board material 100 includes the balancing layer 90, the fifth adhesive layer 92, the inorganic composite board 10a, the fourth adhesive layer 91 and the decorative layer 80 stacked in sequence, as shown in FIG. 9. In some other embodiments, the board material 100 includes the balancing layer 90, the fifth adhesive layer 92, the backboard 50, the second adhesive layer 40, the plywood 30, the first adhesive layer 20, the inorganic composite board 10a, the fourth adhesive layer 91 and the decorative layer 80 stacked in sequence.

Optionally, the fourth adhesive layer 91 is formed by curing the fourth adhesive.

Optionally, when the decorative layer 80 is natural veneer, the fourth adhesive includes a melamine modified UF resin and a flour.

Optionally, in the fourth adhesive, the mass fraction of the flour ranges from 20% to 28%. Specifically, the mass fraction of the flour in the fourth adhesive may be, but is not limited to, 20%, 22%, 24%, 26%, 28%, or the like. If the mass fraction of the flour in the fourth adhesive is too low, the leveling property of the fourth adhesive is insufficient, which reduces the roll-coating property of the fourth adhesive; if the mass fraction of the flour in the fourth adhesive is too high, the fourth adhesive will be too viscous, difficult to apply, and will reduce the adhesive property of the fourth adhesive.

Optionally, the mass fraction of the melamine modified UF resin in the fourth adhesive ranges from 72% to 80%. Specifically, the mass fraction of the melamine modified UF resin in the fourth adhesive may be, but is not limited to, 72%, 74%, 76%, 78%, or the like. If the mass fraction of the melamine modified UF resin in the fourth adhesive is excessively low, the fourth adhesive will be too viscous, difficult to apply, and will reduce the adhesive property of the fourth adhesive; if the mass fraction of the melamine modified UF resin in the fourth adhesive is excessively high, the leveling property of the fourth adhesive is insufficient, and the roll-coating property of the fourth adhesive is reduced.

Optionally, when the decorative layer 80 may be LVT or PET, the fourth adhesive is a moisture-curing reactive polyurethane hot melt adhesive (Polyurethane Reactive, referred to as PUR adhesive).

Optionally, the fifth adhesive layer 92 is formed by curing the fifth adhesive.

Optionally, when the balancing layer 90 is the thin veneer, the fifth adhesive includes a melamine modified UF resin and a flour. Optionally, in the fifth adhesive, the mass fraction of the flour ranges from 20% to 28%. Specifically, the mass fraction of the flour in the fifth adhesive may be, but is not limited to, 20%, 22%, 24%, 26%, 28%, or the like. If the mass fraction of the flour in the fifth adhesive is too low, the leveling property of the fifth adhesive is insufficient, which reduces the roll-coating property of the fifth adhesive; if the mass fraction of the flour in the fifth adhesive is too high, the fifth adhesive will be too viscous, difficult to apply, and will reduce the adhesive property of the fifth adhesive. Optionally, the mass fraction of the melamine modified UF resin in the fifth adhesive ranges from 72% to 80%. Specifically, the mass fraction of the melamine modified UF resin in the fifth adhesive may be, but is not limited to, 72%, 74%, 76%, 78%, or the like. If the mass fraction of the melamine modified UF resin in the fifth adhesive is excessively low, the fifth adhesive will be too viscous, difficult to apply, and will reduce the adhesive property of the fifth adhesive; if the mass fraction of the melamine modified UF resin in the fifth adhesive is excessively high, the leveling property of the fifth adhesive is insufficient, and the roll-coating property of the fifth adhesive is reduced.

Optionally, when the balancing layer 90 may be LVT or PET, the fifth adhesive is a moisture-curing reactive polyurethane hot melt adhesive (Polyurethane Reactive, referred to as PUR adhesive) or a two-component acrylic adhesives, two-component epoxy adhesives, two-component polyurethane adhesives (referred to as AB adhesives).

The board material 100 of the embodiment of the present disclosure can be prepared by the method described in the following embodiments of the present disclosure. In addition, it can also be prepared by other methods. The preparation method of the embodiment of the present disclosure is only one or more preparation methods of the board material 100 of the present disclosure, and should not be understood as limiting the board material 100 provided by the embodiment of the present disclosure.

As illustrated in FIG. 10. The embodiment of the present disclosure further provides a preparation method of the board material 100, and the preparation method includes:

S21, Providing an inorganic gel and a plant fiber, the raw material components of the inorganic gel include a magnesium sulfate and a magnesium oxide, and the mass ratio of the magnesium sulfate to the magnesium oxide ranges from 0.4 to 0.5;

S22, Stirring and mixing the inorganic gel and the plant fiber to obtain a mixture; and Optionally, the weight of the inorganic gel and the plant fiber is measured according to a preset mass ratio, the crushed plant fiber is conveyed to the mixer by a belt, the inorganic gel is evenly sprayed on the plant fiber through the nozzle of the mixer, and stirring with a 3.5 m spiral muddler to obtain the mixture.

S23, Laying, cold-pressing and locking the mold, and drying the mixture in sequence to cure the inorganic gel to form an inorganic material, and obtain an inorganic board 10, the board material 100 includes an inorganic board 10, in which the mass ratio of the inorganic material to the plant fiber ranges from 1.2 to 1.5, and the 24 h water-absorbing thickness swelling of the inorganic board 10 is less than or equal to 3%.

The detailed descriptions of other aspects of the inorganic board 10, inorganic materials, and plant fibers, please refer to the description of the corresponding parts of the above embodiments, which will not be repeated here.

The board material 100 prepared by the preparation method of the present disclosure includes an inorganic board 10, the inorganic board 10 includes a plant fiber and an inorganic material, in which the mass ratio of the inorganic material to the plant fiber is in the range of 1.2 to 1.5; the raw material components of the inorganic material include a magnesium sulfate, and a magnesium oxide, the 24 h water-absorbing thickness swelling of the inorganic board 10 is less than or equal to 3%. In the embodiment of the present disclosure, the inorganic material is added to the inorganic board 10, and the inorganic board 10 has a lower 24 h water-absorbing thickness swelling through the design of the inorganic material components and the ratio of the inorganic material to the plant fiber; in addition, the board material 100 of the present disclosure includes an inorganic board, which is prepared by pressing and has a higher flatness, so that when a decorative layer 80 is attached to the surface of the inorganic board 10, it has a higher yield, improves the preparation yield of the board material 100, and reduces the preparation cost of the board material 100; furthermore, the inorganic board 10 can be used as the surface plate of the board material 100, and when the inorganic board 10 is used as the surface plate, the defect requirements for the Veneer 32 under the surface plate are reduced, and the cost of the board material 100 can be better reduced while ensuring that the performance of the board material 100 remains unchanged.

Optionally, the raw material components of the inorganic gel further include magnesium chloride, and the mass ratio of magnesium chloride to magnesium oxide in the raw material components of the inorganic gel is in the range of 0.05 to 0.15. If the mass ratio of magnesium chloride to magnesium oxide in the raw material components of the inorganic material is excessively small, the content of magnesium chloride in the raw material components of the inorganic material will be too low and the content of magnesium oxide will be too high; if the content of magnesium chloride is too low, the bonding strength of the inorganic gel will be reduced, thereby reducing the bonding force between the inorganic gel and the plant fiber, which is not conducive to improving the hardness and mechanical strength of the inorganic board 10; if the content of magnesium oxide is too high, more magnesium hydroxide (Mg(OH)$_2$ colloid) colloid will be formed in a short time during the hydration of magnesium oxide, thereby increasing the alkalinity of the inorganic gel, preventing the normal progress of the magnesium oxychloride gel, and causing the magnesium chloride to exist in the form of MgCl$_2$.6H$_2$O, which will also aggravate the moisture absorption and halogen return of the inorganic board 10. If the mass ratio of magnesium chloride to magnesium oxide in the raw material components of the inorganic material is excessively large, the content of magnesium chloride in the raw material components of the inorganic material is too high and the content of magnesium oxide is too low; if the content of magnesium chloride is too high, the inorganic board 10 will be prone to deformation and cracking; if the content of magnesium oxide is too low, the magnesium oxychloride gel formed in the inorganic gel will be less. In addition, magnesium chloride will be excessive, and chloride ions will exist in the inorganic board 10 in a free form, making the inorganic board 10 easy to absorb moisture and return to halogen or absorb moisture, thereby reducing the moisture resistance of the inorganic board 10.

Optionally, in the raw material components of the inorganic gel, the mass ratio of the magnesium sulfate to the magnesium oxide ranges from 0.4 to 0.5. Specifically, the mass ratio of the magnesium sulfate to the magnesium oxide in the raw material components of the inorganic gel may be, but is not limited to, 0.4, 0.41, 0.42, 0.43, 0.44, 0.45, 0.46, 0.47, 0.48, 0.49, 0.5, or the like. If the mass ratio of the magnesium sulfate to the magnesium oxide is too low, the content of the magnesium sulfate is too low and the content of the magnesium oxide is too high; if the content of the magnesium sulfate is too low, the water resistance and compressive strength of the inorganic board 10 are reduced; if the content of the magnesium oxide is too high, when the magnesium oxide is hydrated, more magnesium hydroxide (Mg(OH)$_2$ colloid) colloid will be formed in a short time, which increases the alkalinity of the inorganic gel and aggravates the moisture absorption and halogen return of the inorganic board 10. If the mass ratio of the magnesium sulfate to the magnesium oxide is too high, the content of magnesium sulfate is too high and the content of magnesium oxide is too low; if the content of magnesium sulfate is too high, the strength of the inorganic board 10 will be reduced, the inorganic board 10 will be brittle, and the impact strength will be reduced, which is not conducive to the application of the inorganic board 10; if the content of magnesium oxide is too low, the magnesium oxychloride gel formed in the inorganic gel will be less. In addition, magnesium chloride will be excessive, and chloride ions will exist in the inorganic board 10 in a free form, making the inorganic board 10 easy to absorb moisture and return to halogen or absorb moisture, thereby reducing the moisture resistance of the inorganic board 10.

Optionally, the raw material components of the inorganic gel further include a modifier, and the modifier is citric acid; in the raw material components of the inorganic gel, the mass ratio of the modifier to the magnesium chloride ranges from 0.025 to 0.045. Specifically, the mass ratio of the modifier to the magnesium chloride in the raw material components of the inorganic gel may be, but is not limited to, 0.025, 0.028, 0.030, 0.033, 0.035, 0.038, 0.040, 0.043, 0.045, or the like. If the mass ratio of the modifier to the magnesium chloride in the raw material components of the inorganic gel is excessively small, the content of the modifier is too low, the reaction degree of magnesium chloride is limited, and the moisture absorption and halogen return of the inorganic board 10 is reduced; if the mass ratio of the modifier to the magnesium chloride is excessively large, the content of the modifier is too high, and the thermal stability of the inorganic gel will be reduced.

In some embodiments, the raw material components of the inorganic gel include the following components in parts by weight: 12 to 16 parts of magnesium chloride; 68 to 75 parts of magnesium sulfate; 150 to 170 parts of magnesium oxide; 0.3 to 1.2 parts of a modifier; and 110 to 120 parts of water, the formed inorganic gel has better bonding properties with the plant fiber, which can better improve the internal bonding strength of the inorganic board 10, making the inorganic board 10 less prone to stratification; in addition, it can better improve the toughness and mechanical strength of the inorganic board 10, making the inorganic board 10 has a good rigidity and good impact strength.

In a specific embodiment, the raw material components of the inorganic gel include, by weight: 14 parts of magnesium chloride, 71.8 parts of magnesium sulfate, 160 parts of magnesium oxide, 0.5 parts of modifier and 116.8 parts of water. When the inorganic gel prepared by this raw material components is used to prepare the inorganic board 10, the inorganic gel can have better bonding properties with the plant fiber, and the internal bonding strength of the inorganic board 10 can be better improved, so that the inorganic board 10 is less prone to delamination; in addition, the toughness and mechanical strength of the inorganic board 10 can be better improved, so that the inorganic board 10 has a good rigidity and good impact strength. In addition, the inorganic board 10 obtained by the ratio of the inorganic material is less prone to have a moisture regurgitation, condensation of water droplets and the like under high temperature and high humidity environment, and has a lower 24 h water-absorbing thickness swelling.

The detailed descriptions of other aspects such as magnesium chloride, magnesium oxide, magnesium sulfate, citric acid, or the like, please refer to the description of the corresponding part of the above embodiment, and will not be repeated again.

As illustrated in FIG. 11. In some embodiments, the raw material components of the inorganic gel further include the magnesium chloride and the modifier. In S21, the providing an inorganic gel, includes:

S211, Dissolving the magnesium chloride in water at room temperature;

Optionally, a certain amount of deionized water or tap water is placed in a configuration tank and stirred at room temperature to gradually dissolve the magnesium chloride.

S212, Adding the magnesium sulfate and stirring at room temperature until the magnesium sulfate is completely dissolved; and Optionally, adding magnesium sulfate to the configuration tank and stirring until the magnesium sulfate is completely dissolved to obtain a magnesium salt solution.

S213, Adding the magnesium oxide and the modifier, and stirring at room temperature to react the magnesium chloride, the magnesium sulfate and the magnesium oxide to obtain the inorganic gel.

After the magnesium oxide is added, magnesium oxide and magnesium salt solution (magnesium chloride and magnesium sulfate solution) react to form xMg(OH)$_2$·yMgCl$_2$·zH$_2$O, xMg(OH)$_2$·yMgSO$_4$·zH$_2$O to obtain an inorganic gel. At room temperature, the main components of the inorganic gel include 3Mg(OH)$_2$·MgCl$_2$·8H$_2$O, 3Mg(OH)$_2$·MgSO$_4$·8H$_2$O, and 5Mg(OH)$_2$·MgCl$_2$·8H$_2$O.

Optionally, the pH value of the inorganic gel ranges from 8.0 to 9.5. Specifically, the pH value of the inorganic gel may be, but is not limited to, 8.0, 8.3, 8.5, 8.8, 9.0, 9.3, 9.5, or the like.

The inorganic gel prepared by the method of this embodiment has better bonding properties with plant fibers. When the inorganic gel and plant fibers are composited for preparing the inorganic board 10, the prepared inorganic board 10 can have higher hardness, compressive strength and impact strength, or the like. In addition, the inorganic board 10 can also have lower 24 h water absorbing thickness expansion rate, higher waterproof and moisture-proof properties, better Fire rating, or the like.

In some embodiments, in S21, the providing plant fiber includes: crushing the plant fiber raw material to obtain plant fiber, the size of the plant fiber ranges from 1.5 mm to 2.0 mm.

Optionally, the wood or plant straw is removed from impurities and dried, and then crushed; then screened with a sieve to obtain plant fiber with a size of 1.5 mm to 2.0 mm. It can be understood that the aperture of the sieve is 1.5 mm to 2.0 mm.

Specifically, the size of the plant fiber may be, but is not limited to, 1.5 mm, 1.6 mm, 1.7 mm, 1.8 mm, 1.9 mm, 2.0 mm, or the like. If the size of the plant fiber is excessively small, the crushing requirement is high, which increases the preparation cost of the inorganic board 10. If the size of the plant fiber is excessively large, the surface roughness of the prepared inorganic board 10 increases and the strength of the inorganic board 10 decreases. In this embodiment, by adjusting the size of the plant fiber range from 1.5 mm to 2.0 mm, the surface roughness of the inorganic board 10 can be smaller, smoother, and have higher strength.

Optionally, S22, the stirring and mixing the inorganic gel and the plant fiber to obtain a mixture, including: the weight of the inorganic gel and the plant fiber is measured according to a preset mass ratio, the crushed plant fiber is conveyed to the mixer by a belt, the inorganic gel is evenly sprayed on the plant fiber through the nozzle of the mixer, and stirring with a 3.5 m spiral muddler to obtain the mixture.

As illustrated in FIG. 12. In some embodiments, in S23, the laying, cold-pressing and locking the mold, and drying the mixture in sequence to cure the inorganic gel to form an inorganic material, and obtain an inorganic board 10, including:

S231, laying the mixture on a pad to obtain a blank, and stacking multiple blanks in sequence;

Optionally, providing a pad and applying a release agent on two opposite surfaces of the pad, placing the pad in a paving machine, a receiving and dividing device is used to lay the mixture, the mixture is laid on the surface of the pad to form a blank of a preset size, and multiple blanks are stacked sequentially by automatic stacking.

S232, Cold-pressing and mold-locking the stacked multiple blanks to obtain a blank stack; and Optionally, a mold is used to clamp the multiple blanks stacked in sequence, and after cold pressing to a preset thickness, the mold is locked to prevent the blanks from rebounding and the size (such as length, width, thickness, or the like.) from changing. After a period of protection in a maintenance room, the mold is automatically removed and naturally cured to obtain a blank stack.

S233, Drying the blank stack at a temperature of 125° C. to 145° C. to obtain the inorganic board 10.

Specifically, the drying temperature may be, but is not limited to, 125° C., 128° C., 130° C., 133° C., 135° C., 138° C., 140° C., 143° C., 145° C., or the like.

The inorganic board 10 obtained by this embodiment has high mechanical strength and hardness, and has low water-absorbing thickness swelling, and has better water resistance and Fire rating, or the like.

As illustrated in FIG. 13. In some embodiments, the drying the blank stack at a temperature of 125° C. to 145° C. to obtain the inorganic board 10, including:

S2331, Setting a mold temperature machine so that the preset outlet temperature of the mold temperature machine is 160° C. to 180° C. and the preset reflux temperature of the mold temperature machine is 125° C. to 145° C.;

Specifically, the preset outlet temperature of the mold temperature machine may be, but not limited to, 160° C., 163° C., 165° C., 168° C., 170° C., 173° C., 175° C., 178° C., 180° C., or the like.

Specifically, the preset reflux temperature may be, but not limited to, 125° C., 128° C., 130° C., 133° C., 135° C., 138° C., 140° C., 143° C., 145° C., or the like.

S2332, When the reflux temperature of the mold temperature machine reaches the preset reflux temperature, placing the blank stack in the mold temperature machine;

Exemplarily, for example, if the preset reflux temperature of the mold temperature machine is 138° C., then when the reflux temperature of the mold temperature machine reaches 138° C., the blank stack is placed in the mold temperature machine (i.e., the blank stack is fed).

S2333, In a first period, turning on the mold temperature machine every a first term, the first period includes a plurality of the first terms;

Optionally, the first period may be, but not limited to, within 50 minutes to 70 minutes after the blank stack is fed; specifically, the first period may be, but not limited to, 50 minutes, 55 minutes, 60 minutes, 66 minutes, 70 minutes, or the like.

Optionally, the first term may be, but not limited to, 3 minutes to 6 minutes; specifically, the first term may be, but not limited to, 3 minutes, 3.5 minutes, 4 minutes, 4.5 minutes, 5 minutes, 5.5 minutes, 6 minutes, or the like.

In a specific example, within one hour after the blank stack is put in (the first period is 1 hour), the mold temperature machine is turned on every 5 minutes (the first term is 5 minutes).

It can be understood that the mold temperature machine is turned off again after being turned on for a preset time (for example, 3 s to 6 s) each time.

S2334, In a second period, turning on the mold temperature machine every a second term, the second period includes a plurality of second terms, the second term is longer than the first term, and the second period is after the first period; and Optionally, the second period may be but not limited to a time period from 50 minutes to 70 minutes after the blank stack is put in; specifically, it may be, but not limited to, a time period after 50 minutes, a time period after 55 minutes, a time period after 60 minutes, a time period after 66 minutes, a time period after 70 minutes, or the like.

Optionally, the second term may be but not limited to 4 minutes to 10 minutes; specifically, the second term may be, but not limited to, 4 minutes, 5 minutes, 6 minutes, 6.5 minutes, 7 minutes, 7.5 minutes, 8 minutes, 8.5 minutes, 9 minutes, 9.5 minutes, 10 minutes, or the like.

In a specific example, after one hour after the blank stack is put in (the second period is after 1 hour), the mold temperature machine is turned on every 8 minutes (the second term is 8 minutes). It can be understood that the mold temperature machine is turned off again after being turned on for a preset time (for example, 3 s to 6 s) each time.

S2335, When the reflux temperature is higher than the preset reflux temperature by 2° C. to 5° C., turning on the mold temperature machine to obtain the inorganic board 10.

Optionally, when the reflux temperature of the mold temperature machine is stabilized at 2° C. to 5° C. higher than the preset reflux temperature, the inorganic board 10 has been prepared and the mold temperature machine can be turned on at this time.

Specifically, the reflux temperature of the mold temperature machine may be, but is not limited to, 2° C., 2° C., 4° C., and 5° C. higher than the preset reflux temperature, the baking is stopped, the mold temperature machine is turned on to obtain the inorganic board 10.

In a specific embodiment, the thickness of each blank is greater than or equal to 10 mm. When the blank body is baked, the preset outlet temperature of the mold temperature machine is set to 170 C° and the preset reflux temperature is set to 135 C°. When the reflux temperature of the mold temperature machine reaches 135 C°, the blank stack is placed in the mold temperature machine (blank stack feeding). In the first hour, the mold temperature machine is opened and closed every 5 minutes, and the reflux temperature of the mold temperature machine is about 127 C° after each opening and closing. After one hour, the mold temperature machine is opened and closed every 8 minutes until the reflux temperature of the mold temperature machine is stabilized at 138 C°, and then the inorganic board 10 is obtained.

In a specific embodiment, the thickness of each blank is less than 10 mm. When the blank body is baked, setting the preset outlet temperature of the mold temperature machine to 161° C. and the preset reflux temperature of the mold temperature machine to 135° C.; when the reflux temperature of the mold temperature machine reaches 135° C., placing the blank stack in the mold temperature machine (blank stack feeding); within the first hour, opening and closing the mold temperature machine every 3 minutes, and the reflux temperature of the mold temperature machine after each opening and closing is about 127° C.; after one hour, opening and closing the mold temperature machine every 5 minutes until the reflux temperature of the mold temperature machine stabilizes at 137° C., and then the inorganic board 10 is obtained.

In this embodiment, the mold temperature machine is turned on and off once every first term in the first period, and is turned on and off once every second term in the second period, and the second term is made longer than the first term, so that the water vapor in the blank can be removed in time during the reaction and curing of the inorganic gel and the plant fiber, thereby improving the preparation efficiency of the inorganic board 10; in addition, the moisture content of the prepared inorganic board 10 can be reduced; furthermore, it can also prevent the water vapor in the blank from not being removed in time, which may remain in the blank, so that the prepared inorganic board 10 has too many pores, thereby reducing the mechanical strength and the hardness of the inorganic board 10.

As illustrated in FIG. 14. The embodiment of the present disclosure further provides a preparation method of the board material 100, and the preparation method includes:

S31, Providing an inorganic gel and a plant fiber, the raw material components of the inorganic gel include magnesium chloride, magnesium sulfate and magnesium oxide;

S32, Stirring and mixing the inorganic gel and the plant fiber to obtain a mixture;

S33, Laying, cold-pressing and locking the mold, and drying the mixture in sequence to cure the inorganic gel to form an inorganic material, and obtain an inorganic board 10, the board material 100 includes an inorganic board 10, in which the mass ratio of the inorganic material to the plant fiber ranges from 1.2 to 1.5, and the 24 h water-absorbing thickness swelling of the inorganic board 10 is less than or equal to 3%;

The detailed descriptions of S31 to S33 please refer to the corresponding parts of S21 to S23 in the above embodiments, which will not be repeated here.

S34, Providing a plywood 30 and a backboard 50, and forming a first adhesive coating and a second adhesive coating on two opposite surfaces of the plywood 30 respectively;

Optionally, a first adhesive is applied to one surface of the plywood 30 to form a first adhesive coating, and a second adhesive is applied to the other surface of the plywood 30 to form a second adhesive coating.

Optionally, the first adhesive includes a melamine modified UF resin and a flour.

Optionally, in the first adhesive, the mass fraction of the flour ranges from 40% to 50%. Specifically, the mass fraction of the flour in the first adhesive may be, but not limited to, 40%, 42%, 44%, 46%, 48%, 50%, or the like. If the mass fraction of the flour in the first adhesive is too low, the leveling property of the first adhesive is insufficient, which reduces the roll-coating property of the first adhesive; if the mass fraction of the flour in the first adhesive is too high, the first adhesive will be too viscous, difficult to apply, and will reduce the adhesive property of the first adhesive.

Optionally, the mass fraction of the melamine modified UF resin in the first adhesive ranges from 50% to 60%. Specifically, the mass fraction of the melamine modified UF resin in the first adhesive may be, but not limited to, 50%, 52%, 55%, 56%, 58%, 60%, or the like. If the mass fraction of the melamine modified UF resin in the first adhesive is excessively low, the first adhesive will be too viscous, difficult to apply, and will reduce the adhesive property of the first adhesive; if the mass fraction of the melamine modified UF resin in the first adhesive is excessively high, the leveling property of the first adhesive is insufficient, and the roll-coating property of the first adhesive is reduced.

Optionally, the coating amount of the first adhesive ranges from 400 g/m² to 460 g/m². Specifically, the coating amount of the first adhesive may be, but is not limited to, 400 g/m², 410 g/m², 420 g/m², 430 g/m², 450 g/m², 450 g/m², 460 g/m², or the like. If the coating amount of the first adhesive is excessively small, the bonding force between the inorganic board 10 and the plywood 30 is reduced; if the coating amount of the first adhesive is excessively large, the mechanical strength of the prepared board material 100 is reduced.

Optionally, the second adhesive includes a melamine modified UF resin and a flour.

Optionally, in the second adhesive, the mass fraction of the flour ranges from 40% to 50%. Specifically, the mass fraction of the flour in the second adhesive may be, but not limited to, 40%, 42%, 44%, 46%, 48%, 50%, or the like. If the mass fraction of the flour in the second adhesive is too low, the leveling property of the second adhesive is insufficient, which reduces the roll-coating property of the second adhesive; if the mass fraction of the flour in the second adhesive is too high, the second adhesive will be too viscous, difficult to apply, and will reduce the adhesive property of the second adhesive.

Optionally, the mass fraction of the melamine modified UF resin in the second adhesive ranges from 50% to 60%. Specifically, the mass fraction of the melamine modified UF resin in the second adhesive may be, but not limited to, 50%, 52%, 55%, 56%, 58%, 60%, or the like. If the mass fraction of the melamine modified UF resin in the second adhesive is excessively low, the second adhesive will be too viscous, difficult to apply, and will reduce the adhesive property of the second adhesive; if the mass fraction of the melamine modified UF resin in the second adhesive is excessively high, the leveling property of the second adhesive is insufficient, and the roll-coating property of the second adhesive is reduced.

Optionally, the coating amount of the second adhesive ranges from 400 g/m$^2$ to 460 g/m$^2$. Specifically, the coating amount of the second adhesive may be, but is not limited to, 400 g/m$^2$, 410 g/m$^2$, 420 g/m$^2$, 430 g/m$^2$, 450 g/m$^2$, 450 g/m$^2$, 460 g/m$^2$, or the like. If the coating amount of the second adhesive is excessively small, the bonding force between the inorganic board 10 and the plywood 30 is reduced; if the coating amount of the second adhesive is excessively large, the mechanical strength of the prepared board material 100 is reduced.

S35, Laying the inorganic board 10 on the surface of the first adhesive coating away from the plywood 30, and laying the backboard 50 on the surface of the second adhesive coating away from the plywood 30;

It can be understood that the inorganic board 10 is attached to the first adhesive coating, and the backboard 50 is attached to the second adhesive coating to form a laminated construction in which the backboard 50, the second adhesive coating, the plywood 30, the first adhesive coating and the inorganic board 10 are stacked in sequence. S36, Performing a first cold pressing at a pressure of 5 kg/cm$^2$ to 7 kg/cm$^2$; and Optionally, performing a first cold pressing on the laminated construction firstly at a pressure of 5 kg/cm$^2$ to 7 kg/cm$^2$, and the time of the first cold pressing is 30 min to 120 min. Before the first hot pressing, the first cold pressing is performed first, so that the first adhesive coating and the second adhesive coating can better form a continuous adhesive film, so that the first adhesive coating can better contact with the inorganic board 10 and the plywood 30, and increase the contact area between the inorganic board 10 and the first adhesive coating, and the contact area between the plywood 30 and the first adhesive coating, and at the same time, the second adhesive coating can better contact with the backboard 50 and the plywood 30, and increase the contact area between the backboard 50 and the second adhesive coating, and the contact area between the plywood 30 and the second adhesive coating, so that the board material 100 has better bonding force between each layer, and is less prone to delamination after long-term use, and has better mechanical strength.

Specifically, the pressure of the first cold pressing may be, but not limited to, 5 kg/cm$^2$, 5.5 kg/cm$^2$, 6 kg/cm$^2$, 6.5 kg/cm$^2$, 7 kg/cm$^2$, or the like. If the pressure of the first cold pressing is too low, it is difficult for the first adhesive coating and the second adhesive coating to form a continuous adhesive film, and the contact area between the first adhesive coating and the inorganic board 10, the contact area between the first adhesive coating and the plywood 30, the contact area between the second adhesive coating and the backboard 50, the contact area between the second adhesive coating and the plywood 30 are still small; if the pressure of the first cold pressing is too high, it is easy to damage the inorganic board 10, the plywood 30 or the backboard 50.

Specifically, the time of the first cold pressing may be, but is not limited to, 30 min, 40 min, 50 min, 60 min, 80 min, 100 min, 120 min, or the like. If the time of the first cold pressing is too short, it is difficult for the first adhesive coating and the second adhesive coating to form a continuous adhesive film, and the contact area between the first adhesive coating and the inorganic board 10, the contact area between the first adhesive coating and the plywood 30, and the contact area between the second adhesive coating and the backboard 50, the contact area between the second adhesive coating and the plywood 30 are still small; if the time of the first cold pressing is too long, the preparation cost of the board material 100 is increased.

S37, Performing a first hot pressing at a pressure of 8 kg/cm$^2$ to 13 kg/cm$^2$ and a temperature of 115 C.$^\circ$ to 125 C.$^\circ$, so that the first adhesive coating forms a first adhesive layer 20 and the second adhesive coating forms a second adhesive layer 40; before the first hot pressing, the moisture content of the backboard 50 is higher than the moisture content of the inorganic board 10.

Optionally, Performing a first hot pressing at a pressure of 8 kg/cm$^2$ to 13 kg/cm$^2$ and a temperature of 115° C. to 125° C., and the time of the first hot pressing is 8 min to 15 min, so that the first adhesive coating is cured to form the first adhesive layer 20, and the second adhesive coating is cured to form the second adhesive layer 40, to obtain the board material 100.

Optionally, the preparation method further includes: curing the board material 100 for 7 days, sanding to a certain thickness, trimming the edges, and packaging it for storage.

Specifically, the pressure of the first hot pressing may be, but is not limited to, 8 kg/cm$^2$, 9 kg/cm$^2$, 10 kg/cm$^2$, 11 kg/cm$^2$, 12 kg/cm$^2$, 13 kg/cm$^2$, or the like. If the pressure of the first hot pressing is too low, the bonding force of the inorganic board 10, the plywood 30 and the backboard 50 is reduced; if the pressure of the first hot pressing is too high, it is easy to crush the inorganic board 10, the plywood 30 or the backboard 50.

Specifically, the time of the first hot pressing may be, but is not limited to, 8 min, 9 min, 10 min, 11 min, 12 min, 13 min, 14 min, 15 min, or the like. If the time of the first hot pressing is too short, the curing of the first adhesive coating and the second adhesive coating is incomplete, so that the bonding force of the inorganic board 10, the plywood 30 and the backboard 50 is reduced, and the water resistance and mechanical strength of the prepared board material 100 are reduced; if the time of the first hot pressing is too long, the preparation cost of the board material 100 is increased.

Specifically, the temperature of the first hot pressing may be, but is not limited to, 115° C., 116° C., 117° C., 118° C., 119° C., 120° C., 121° C., 122° C., 123° C., 124° C., 125° C., or the like. If the temperature of the first hot pressing is too low, the first adhesive coating and the second adhesive coating are not completely cured, which reduces the bonding force of the inorganic board 10, the plywood 30 and the backboard 50, and reduces the water resistance and mechanical strength of the prepared board material 100; if the temperature of the first hot pressing is too high, the curing speed of the first adhesive coating and the second adhesive coating is too fast, and bubbles are easily present in the first adhesive layer 20 and the second adhesive layer 40, which also reduces the bonding force of the inorganic board 10, the plywood 30 and the backboard 50, and reduces the water resistance and mechanical strength of the prepared board material 100.

In this embodiment, when the inorganic board 10 is combined with the plywood 30 and the backboard 50, the first cold pressing is performed first, and then the first hot pressing is performed, which can improve the bonding force between the inorganic board 10, the plywood 30 and the backboard 50 of the prepared board material 100, thereby the board material 100 have higher mechanical strength. In addition, during the first hot pressing, although the inorganic board 10, the backboard 50 and the plywood 30 will shrink due to water loss, due to the high density of the inorganic board 10, when the moisture content of the inorganic board 10 is equivalent to that of the backboard 50, after the first hot pressing is performed, and after the inorganic board 10 is shrank, the board material 100 is more likely to warp or bend toward one side of the inorganic board 10. In this embodiment, by making the moisture content of the backboard 50 greater than the moisture content of the inorganic board 10 before the first hot pressing, the internal stress or tension generated by the shrinkage of the backboard 50 after the first hot pressing can better balance the internal stress or tension generated by the shrinkage of the inorganic board 10, so that the prepared board material 100 is straighter and has a higher flatness.

In some embodiments, before the first hot pressing, the moisture content of the backboard 50 is greater than the moisture content of the plywood 30, and the moisture content of the plywood 30 is greater than the moisture content of the inorganic board 10; the moisture content of the backboard 50 ranges from 12% to 20%; the moisture content of the plywood 30 ranges from 10% to 12%; the moisture content of the inorganic board 10 ranges from 4% to 7%.

Specifically, the moisture content of the backboard 50 may be, but is not limited to, 12%, 13%, 14%, 15%, 16%, 17%, 18%, 19%, and 20%. If the moisture content of the backboard 50 is too low, it is difficult to balance the internal stress generated by the shrinkage of the inorganic board 10 during the first hot pressing, so that the board material 100 is warped or bent toward one side of the inorganic board 10; if the moisture content of the backboard 50 is too high, the internal stress generated by the shrinkage of the backboard 50 during the first hot pressing is greater than the internal stress generated by the shrinkage of the inorganic board 10 during the first hot pressing, so that the board material 100 is warped or bent toward one side of the backboard 50.

Specifically, the moisture content of the plywood 30 may be, but is not limited to, 10%, 10.3%, 10.5%, 10.8%, 11%, 11.3%, 11.5%, 11.8%, 12%, or the like. If the moisture content of the plywood 30 is too low, the plywood 30 in the board material 100 is prone to expansion and deformation after absorbing moisture. In addition, the plywood 30 is prone to brittleness, reduced toughness, and difficult to cut. It is prone to breakage, edge collapse and other damage during processing. If the moisture content of the plywood 30 is too high, it is prone to warping, deformation, and splitting after the first hot pressing.

Specifically, the moisture content of the inorganic board 10 may be, but is not limited to, 4%, 4.2%, 4.4%, 4.6%, 4.8%, 5%, 5.2%, 5.4%, 5.6%, 5.8%, 6%, 6.2%, 6.4%, 6.6%, 6.8%, 7%, or the like. If the moisture content of the inorganic board 10 is too low, it is difficult to balance the internal stress generated by the shrinkage of the backboard 50 during the first hot pressing, so that the board material 100 is warped or bent toward one side of the backboard 50;

if the moisture content of the inorganic board 10 is too high, the internal stress generated by the shrinkage of the inorganic board 10 during the first hot pressing is greater than the internal stress generated by the shrinkage of the backboard 50, so that the board material 100 is warped or bent toward one side of the inorganic board 10.

In this embodiment, before the first hot pressing, the moisture content of the backboard 50 is greater than the moisture content of the plywood 30, and the moisture content of the plywood 30 is greater than the moisture content of the inorganic board 10, and the moisture content of the backboard 50, the plywood 30 and the inorganic board 10 are designed, so that the board material 100 is less prone to deformation, bending, warping and the like, and the board material 100 is flatter.

As illustrated in FIG. 15. In some embodiments, in S34, providing the plywood 30 includes:

S341, Providing a binder and a plurality of veneers 32;

Optionally, the binder includes melamine modified UF resin and flour.

Optionally, the mass fraction of the flour in the binder ranges from 40% to 50%. Specifically, the mass fraction of the flour in the binder may be, but not limited to, 40%, 42%, 44%, 46%, 48%, 50%, or the like. If the mass fraction of the flour in the binder is too low, the leveling property of the binder is insufficient, which reduces the roll-coating property of the binder; if the mass fraction of the flour in the binder is too high, the binder will be too viscous, difficult to apply, and will reduce the adhesive property of the binder.

Optionally, the mass fraction of the melamine modified UF resin in the binder ranges from 50% to 60%. Specifically, the mass fraction of the melamine modified UF resin in the binder may be, but not limited to, 50%, 52%, 55%, 56%, 58%, 60%, or the like. If the mass fraction of the melamine modified UF resin in the binder is excessively low, the binder will be too viscous, difficult to apply, and will reduce the adhesive property of the binder; if the mass fraction of the melamine modified UF resin in the binder is excessively high, the leveling property of the binder is insufficient, and the roll-coating property of the binder is reduced.

Optionally, the veneer 32 may be, but not limited to, at least one of *Eucalyptus* veneer, poplar veneer, or miscellaneous wood veneer. In a specific example, the veneer 32 is a 1.7 mm thick *Eucalyptus* veneer.

S342, Coating the binder on the surface of some of the plurality of veneers 32, and stacking the plurality of veneers 32 in sequence;

Optionally, one layer of the plurality of veneers 32 is not coated with binder, and the other layers are coated with binder on one surface to form a binder coating, and the plurality of veneers 32 are stacked in sequence to form a stack of the plurality of veneers 32 and the plurality of binder coatings alternately stacked in sequence.

Optionally, the coating amount of the binder of each binder coating ranges from 360 g/m$^2$ to 400 g/m$^2$. Specifically, the coating amount of the binder may be, but is not limited to, 360 g/m$^2$, 370 g/m$^2$, 380 g/m$^2$, 390 g/m$^2$, 400 g/m$^2$, or the like. If the coating amount of the binder is too little, the bonding force between the veneers 32 is reduced; if the coating amount of the binder is too much, the mechanical strength of the prepared board material 100 is reduced.

S343, Performing a second cold pressing at a pressure of 5 kg/cm$^2$ to 7 kg/cm$^2$; and Optionally, performing a second cold pressing on the stack at a pressure of 5 kg/cm$^2$ to 7 kg/cm$^2$, and the time of the second cold pressing is 30 min to 120 min. Performing a second cold pressing before the second hot pressing can allow the binder coating to form a continuous film better, allow the binder coating to better contact with the veneer 32, and increase the contact area between the binder coating and the veneer 32, so that the veneer 32 of the prepared plywood 30 have better bonding force, and are less prone to delamination after long-term use, and have better mechanical strength.

Specifically, the pressure of the second cold pressing may be, but not limited to, 5 kg/cm$^2$, 5.5 kg/cm$^2$, 6 kg/cm$^2$, 6.5 kg/cm$^2$, 7 kg/cm$^2$, or the like. If the pressure of the second cold pressing is too low, it is difficult for the binder coating to form a continuous film, and the contact area between the binder coating and the veneer 32 is still small; if the pressure of the second cold pressing is too high, it is easy to damage the veneer 32.

Specifically, the time of the second cold pressing may be, but is not limited to, 30 min, 40 min, 50 min, 60 min, 80 min, 100 min, 120 min, or the like. If the time of the second cold pressing is too short, it is difficult for the binder coating to form a continuous film, and the contact area between the binder coating and the veneer 32 is still small; if the time of the second cold pressing is too long, the preparation cost of the plywood 30 is increased.

S344, Performing a second hot pressing at a pressure of 8 kg/cm$^2$ to 13 kg/cm$^2$ and a temperature of 115° C. to 125° C. to cure the binder to form a bonding layer 31, and obtaining the plywood 30, the plywood 30 includes a plurality of bonding layers 31 and a plurality of veneers 32, the bonding layers 31 and the veneers 32 are alternately stacked in sequence, the fibers of one of the two adjacent veneers 32 extend along a first direction, and the fibers of the other of the two adjacent veneers extend along a second direction, the first direction intersects with the second direction.

Optionally, perform a second hot pressing at a pressure of 8 kg/cm$^2$ to 13 kg/cm$^2$ and a temperature of 115 C.° to 125 C.°, and the time of the second hot pressing is 8 min to 15 min, so that the binder coating is cured to form a bonding layer 31.

Specifically, the pressure of the second hot pressing may be, but not limited to, 8 kg/cm$^2$, 9 kg/cm$^2$, 10 kg/cm$^2$, 11 kg/cm$^2$, 12 kg/cm$^2$, 13 kg/cm$^2$, or the like. If the pressure of the second hot pressing is too low, the bonding force between the plurality of veneers 32 is reduced; if the pressure of the second hot pressing is too high, the plywood 30 is easily crushed.

Specifically, the time of the second hot pressing may be, but not limited to, 8 min, 9 min, 10 min, 11 min, 12 min, 13 min, 14 min, 15 min, or the like. If the time of the second hot pressing is too short, the curing of the binder is incomplete, which reduces the bonding force of the plurality of veneer 32, and the water resistance and mechanical strength of the prepared plywood 30 are reduced; if the time of the second hot pressing is too long, the preparation cost of the plywood 30 is increased.

Specifically, the temperature of the second hot pressing may be, but is not limited to, 115° C., 116° C., 117° C., 118° C., 119° C., 120° C., 121° C., 122° C., 123° C., 124° C., 125° C., or the like. If the temperature of the second hot pressing is too low, the curing of the binder is incomplete, which reduces the bonding force of the plurality of veneer 32, and reduces the water resistance and mechanical strength of the obtained plywood 30; if the temperature of the second hot pressing is too high, the curing speed of the adhesive is too fast, and bubbles are easily present in the formed bonding layer 31, which also reduces the bonding force of the plurality of veneer 32, and reduces the water resistance and mechanical strength of the obtained plywood 30.

Figure 16:
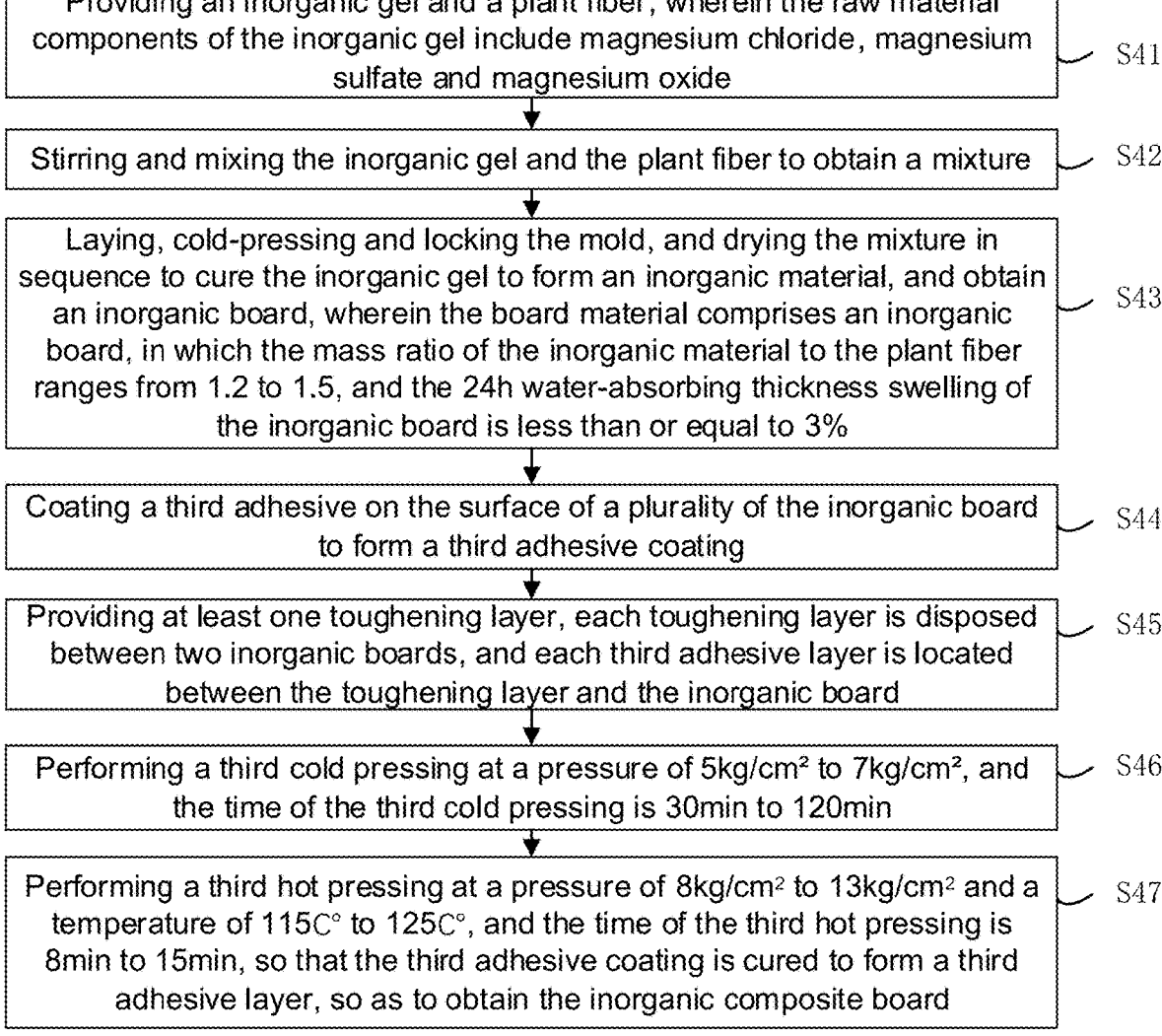
FIG. 16 is a schematic diagram of the flow chart of the method for preparing the board material according to the forth embodiment of the present disclosure.

As illustrated in FIG. 16. The embodiment of the present disclosure further provides a preparation method of the board material 100, the preparation method includes:

S41, Providing an inorganic gel and a plant fiber, the raw material components of the inorganic gel include magnesium chloride, magnesium sulfate and magnesium oxide;

S42, Stirring and mixing the inorganic gel and the plant fiber to obtain a mixture;

S43, Laying, cold-pressing and locking the mold, and drying the mixture in sequence to cure the inorganic gel to form an inorganic material, and obtain an inorganic board 10, the board material 100 includes an inorganic board 10, in which the mass ratio of the inorganic material to the plant fiber ranges from 1.2 to 1.5, and the 24 h water-absorbing thickness swelling of the inorganic board 10 is less than or equal to 3%;

The detailed descriptions of S41 to S43 please refer to the corresponding parts of S21 to S23 in the above embodiments, which will not be repeated here.

S44, Coating a third adhesive on the surface of a plurality of the inorganic board 10 to form a third adhesive coating;

Optionally, the third adhesive includes phenolic resin and flour. Optionally, the mass fraction of the flour in the third adhesive ranges from 20% to 28%, and the mass fraction of the phenolic resin ranges from 72% to 80%.

Optionally, the coating amount of each layer of the third adhesive ranges from 120 g/m$^2$ to 180 g/m$^2$. Specifically, the coating amount of the third adhesive may be, but is not limited to, 120 g/m$^2$, 130 g/m$^2$, 140 g/m$^2$, 150 g/m$^2$, 160 g/m$^2$, 170 g/m$^2$, 180 g/m$^2$, or the like. If the coating amount of the third adhesive is excessively small, the bonding force between the two layers of inorganic boards 10 is reduced; if the coating amount of the third adhesive is excessively large, the mechanical strength of the prepared inorganic composite board 10a is reduced.

The detailed description of other aspects of the third adhesive, please refer to the description of the corresponding part of the above embodiment, which will not be repeated here.

S45, Providing at least one toughening layer 60, each toughening layer 60 is disposed between two inorganic boards 10, and each third adhesive layer is located between the toughening layer 60 and the inorganic board 10;

It can be understood that the inorganic board 10 and the toughening layer 60 are alternately stacked in sequence, and the adjacent inorganic boards 10 and the toughening layer 60 are bonded by the third adhesive coating.

S46, Performing a third cold pressing at a pressure of 5 kg/cm$^2$ to 7 kg/cm$^2$, and the time of the third cold pressing is 30 min to 120 min;

Specifically, the pressure of the third cold pressing may be, but not limited to, 5 kg/cm$^2$, 5.5 kg/cm$^2$, 6 kg/cm$^2$, 6.5 kg/cm$^2$, 7 kg/cm$^2$, or the like.

If the pressure of the third cold pressing is too low, If the pressure of the third cold pressing is too low, it is difficult for the third adhesive coating to form a continuous film, and the contact area between the third adhesive coating and the inorganic board 10 is still small; if the pressure of the third cold pressing is too high, it is easy to damage the inorganic board 10.

Specifically, the time of the third cold pressing may be, but is not limited to, 30 min, 40 min, 50 min, 60 min, 80 min, 100 min, 120 min, or the like. If the time of the third cold pressing is too short, it is difficult for the third adhesive coating to form a continuous film, and the contact area between the third adhesive coating and the inorganic board 10 is still small; if the time of the third cold pressing is too long, the preparation cost of the inorganic composite board 10a is increased.

S47, Performing a third hot pressing at a pressure of 8 kg/cm$^2$ to 13 kg/cm$^2$ and a temperature of 115 C° to 125 C°, and the time of the third hot pressing is 8 min to 15 min, so that the third adhesive coating is cured to form a third adhesive layer 70, so as to obtain the inorganic composite board 10a.

Specifically, the pressure of the third hot pressing may be, but is not limited to, 8 kg/cm$^2$, 9 kg/cm$^2$, 10 kg/cm$^2$, 11 kg/cm$^2$, 12 kg/cm$^2$, 13 kg/cm$^2$, or the like. If the pressure of the third hot pressing is too low, the bonding force between the inorganic board 10 and the toughening layer 60 is reduced; if the pressure of the third hot pressing is too high, the inorganic board 10 is easily crushed.

Specifically, the time of the third hot pressing may be, but is not limited to, 8 min, 9 min, 10 min, 11 min, 12 min, 13 min, 14 min, 15 min, or the like. If the time of the third hot pressing is too short, the curing of the third adhesive coating is incomplete, so that the bonding force between the inorganic board 10 and the toughening layer 60 is reduced, and the water resistance and mechanical strength of the inorganic composite board 10a are reduced; if the time of the third hot pressing is too long, the preparation cost of the inorganic composite board 10a is increased.

Specifically, the temperature of the third hot pressing may be, but is not limited to, 115° C., 116° C., 117° C., 118° C., 119° C., 120° C., 121° C., 122° C., 123° C., 124° C., 125° C., or the like. If the temperature of the third hot pressing is too low, the third adhesive coating is not completely cured, which reduces the bonding force between the inorganic board 10 and the toughening layer 60, and reduces the water resistance and mechanical strength of the inorganic composite board 10a; if the temperature of the third hot pressing is too high, the curing speed of the third adhesive coating is too fast, and bubbles are easily present in the formed third adhesive layer 70, which also reduces the bonding force between the inorganic board 10 and the toughening layer 60, and reduces the water resistance and mechanical strength of the inorganic composite board 10a.

As illustrated in FIG. 17. The embodiment of the present disclosure further provides a preparation method of the board material 100, the preparation method includes:

S51, Providing an inorganic gel and a plant fiber, the raw material components of the inorganic gel include magnesium chloride, magnesium sulfate and magnesium oxide;

S52, Stirring and mixing the inorganic gel and the plant fiber to obtain a mixture;

S53, Laying, cold-pressing and locking the mold, and drying the mixture in sequence to cure the inorganic gel to form an inorganic material, and obtain an inorganic board 10, the board material 100 includes an inorganic board 10, in which the mass ratio of the inorganic material to the plant fiber ranges from 1.2 to 1.5, and the 24 h water-absorbing thickness swelling of the inorganic board 10 is less than or equal to 3%;

S54, Coating a third adhesive on the surface of a plurality of the inorganic board 10 to form a third adhesive coating;

S55, Providing at least one toughening layer 60, each toughening layer 60 is disposed between two inorganic boards 10, and each third adhesive layer is located between the toughening layer 60 and the inorganic board 10;

S56, Performing a third cold pressing at a pressure of 5 kg/cm$^2$ to 7 kg/cm$^2$, and the time of the third cold pressing is 30 min to 120 min;

S57, Performing a third hot pressing at a pressure of 8 kg/cm$^2$ to 13 kg/cm$^2$ and a temperature of 115 C° to 125 C°, and the time of the third hot pressing is 8 min to 15 min, so as to obtain the inorganic composite board 10a;

The detailed descriptions of S51 to S57 please refer to the corresponding parts of S41 to S47 in the above embodiments, which will not be repeated here.

S58, Coating a fourth adhesive on one side of the inorganic composite board 10a to form a fourth adhesive coating, and coating a fifth adhesive on the other side to form a fifth adhesive coating;

Optionally, when the fourth adhesive and the fifth adhesive both include melamine modified UF resin and flour, the coating amount of the fourth adhesive ranges from 80 g/m$^2$ to 100 g/m$^2$; the coating amount of the fourth adhesive ranges from 100 g/m$^2$ to 120 g/m$^2$.

When the fourth adhesive and the fifth adhesive are both PUR glue, the coating amounts of the fourth adhesive and the fifth adhesive are both 60 g/m$^2$ to 80 g/m$^2$.

The detailed descriptions of other aspects of the fourth adhesive and the fifth adhesive, please refer to the description of the corresponding part of the above embodiment, which will not be repeated here.

S59, Providing a decorative layer 80 on the surface of the fourth adhesive coating, and a balancing layer 90 on the surface of the fifth adhesive coating;

The detailed description of other aspects of the decorative layer 80 and the balancing layer 90, please refer to the description of the corresponding part of the above embodiment, which will not be repeated here.

S510, Performing a compression to cure the fourth adhesive coating to form a fourth adhesive layer 91 and to cure the fifth adhesive coating to form a fifth adhesive layer 92, so as to obtain the board material 100.

When the decorative layer 80 is natural veneer and the balancing layer 90 is thin veneer, the performing a compression includes: a fourth cold pressing at a pressure of 5 kg/cm$^2$ to 7 kg/cm$^2$, and the time of the fourth cold pressing is 30 min to 40 min; and a fourth hot pressing at a pressure of 6 kg/cm$^2$ to 10 kg/cm$^2$ and a temperature of 105 C° to 115 C°, and the time of the fourth hot pressing is 4 min to 8 min.

When the decorative layer 80 is LVT or PET and the balancing layer 90 is LVT or PET, the performing a compression includes: firstly rolling, and then performing the fourth cold pressing at a pressure of 7 kg/cm$^2$ to 9 kg/cm$^2$ for 18 h to 30 h.

As illustrated in FIG. 18. The embodiment of the present disclosure further provides a preparation method of the board material 100, the preparation method includes:

S61, Providing an inorganic gel and a plant fiber, the raw material components of the inorganic gel include magnesium chloride, magnesium sulfate and magnesium oxide;

S62, Stirring and mixing the inorganic gel and the plant fiber to obtain a mixture;

S63, Laying, cold-pressing and locking the mold, and drying the mixture in sequence to cure the inorganic gel to form an inorganic material, and obtain an inorganic board 10, the board material 100 includes an inorganic board 10, in which the mass ratio of the inorganic material to the plant fiber ranges from 1.2 to 1.5, and the 24 h water-absorbing thickness swelling of the inorganic board 10 is less than or equal to 3%;

The detailed descriptions of S61 to S63 please refer to the corresponding parts of S21 to S23 in the above embodiments, which will not be repeated here.

S64, Providing a decorative layer 80 on one side of the inorganic board 10, and a balancing layer 90 on the other side of the inorganic board 10, the decorative layer 80 is impregnated paper, and the balancing layer 90 is balancing paper;

S65, Performing a fifth hot pressing at a pressure of 70 kg/cm$^2$ to 80 kg/cm$^2$ and a temperature of 190° C. to 200° C., and the time of the fifth hot pressing is 25 s to 40 s, to obtain a board material 100.

The board material 100 of the embodiment of the present disclosure is further described below through specific embodiments.

Example 1 and Example 2

The board material 100 of each embodiment is prepared by the following steps:

(1) Preparing an inorganic gel, the inorganic gel includes, by mass fraction, 4% magnesium chloride, 20% magnesium sulfate, 44% magnesium oxide, and the remainder is water.

(2) Providing reed stalk fibers with a size of 1.5 mm to 2.0 mm;

(3) Mixing the inorganic gel and the reed stalk fibers to obtain a mixture, the mass ratio of the inorganic gel to the reed stalk fibers is 2:1;

(4) Laying and cold-pressing the mixture in sequence to obtain a blank stack;

(5) Setting the preset outlet temperature of the mold temperature machine to 161° C. and the preset reflux temperature of the mold temperature machine to 135° C.; when the reflux temperature of the mold temperature machine reaches 135° C., placing the blank stack in the mold temperature machine (blank stack feeding); within the first hour, opening and closing the mold temperature machine every 3 minutes, and the reflux temperature of the mold temperature machine after each opening and closing is about 127° C.; after one hour, opening and closing the mold temperature machine every 5 minutes until the reflux temperature of the mold temperature machine stabilizes at 137° C., and then the inorganic board 10 is obtained.

The thickness of the inorganic board 10 prepared in Example 1 is 3.5 mm; the thickness of the inorganic board 10 prepared in Example 2 is 8.0 mm.

Comparative Example 1

The board material 100 of this comparative example is a commercially available 3.5 mm straw board.

Comparative Example 2

The board material 100 of this comparative example is a commercially available 3.5 mm wood powder board.

Comparative Example 3

The board material 100 of this comparative example is a commercially available 8.0 mm wood powder board.

Comparative Example 4

The board material 100 of this comparative example is a commercially available 8.0 mm yarn board (wood powder).

Comparative Example 5

The board material 100 of this comparative example is a commercially available 8.0 mm rock board (wood powder).

Comparative Example 6

The board material 100 of this comparative example is a commercially available 8.0 mm high-density fiberboard (HDF).

The following performance tests are performed on the board material 100 of Examples 1 to Examples 2 and Comparative Examples 1 to Comparative Examples 6.

(1) Formaldehyde detection: According to GB/T 17657-2022, the desiccator method is used for detection.

(2) 24 h water-absorbing thickness swelling and 2 h water-absorbing thickness swelling: measured according to GB/T 18102-2020.

(3) Moisture content (%), density (g/cm$^3$), internal bonding strength (MPa), surface bonding strength (MPa): tested according to LY/T 1611-2011.

(4) Fire rating (grade): tested according to GB 8624.

(5) Anti-halogen property: tested according to JC 688.

The board material 100 of Examples 1 to 2 and Comparative Examples 1 to 6 was tested for various properties, and the test results are shown in Table 1 below:

TABLE 1

| Test data of the board material 100 of Example 1 to Example 2, Comparative Example 1 to Comparative Example 6 | | | | | | | | |
|---|---|---|---|---|---|---|---|---|
| Example | E.g. 1 | CE 1 | CE 2 | E.g. 2 | CE 3 | CE 4 | CE 5 | CE 6 |
| Formaldehyde | Not detected | 0.02 | 0.02 | Not detected | 0.02 | 0.04 | 0.04 | 0.95 |
| 24 h water-absorbing thickness swelling(%) | 1.9 | 3.4 | 2.8 | 0.8 | 1.4 | 2.2 | 1.5 | 1 |
| 2 h water-absorbing thickness swelling(%) | 2.1 | 6.5 | 3.4 | 1.8 | 2.7 | 2.6 | 2.2 | 3.6 |

TABLE 1-continued

Test data of the board material 100 of Example 1 to Example
2, Comparative Example 1 to Comparative Example 6

| Example | E.g. 1 | CE 1 | CE 2 | E.g. 2 | CE 3 | CE 4 | CE 5 | CE 6 |
|---|---|---|---|---|---|---|---|---|
| Moisture content(%) | 5.1 | 11.8 | 6.7 | 5.2 | 7 | 8 | 7.9 | 6.7 |
| Density (g/cm$^3$) | 1.34 | 1.39 | 1.21 | 1.36 | 1.38 | 1.34 | 1.36 | 0.89 |
| Internal bonding strength (MPa) | 2.3 | 2.2 | 1.9 | 2.3 | 2 | 2.5 | 1.8 | 2.8 |
| Surface bonding strength (MPa) | 1.7 | 1.2 | 1 | 1.7 | 1.2 | 1.5 | 1.5 | 2.1 |
| Fire rating (grade): | A2 | A2 | A2 | A2 | A2 | A2 | A2 | Flammable |
| Anti-halogen property | No water droplets, no moisture | No water droplets, no moisture | No water droplets, no moisture | No water droplets, no moisture | No water droplets, no moisture | With water droplets, | No water droplets, no moisture | No water droplets, no moisture |

From the test results of Example 1 to Example 2 and Comparative Examples 1 to Comparative Examples 6, it can be seen that under the same thickness, the board material 100 (i.e., inorganic board 10) of the embodiment of the present disclosure has lower formaldehyde content, lower 2 h water absorbing thickness expansion rate, lower 24 h water absorbing thickness expansion rate, and lower moisture content. In addition, the board material 100 (i.e., inorganic board 10) of the embodiment of the present disclosure also has higher Fire rating and better water resistance.

Example 3 to Example 11

The difference between each embodiment and Example 1 is that the composition of the inorganic gel is different, and the modifier of each embodiment includes 32% citric acid, 1% magnesium sulfate and the rest of water. The composition of the inorganic gel of each embodiment is shown in Table 2 below:

TABLE 2

Composition of the inorganic gel of Example 3 to Example 11

| Example | Magnesium chloride (%) | Magnesium sulfate (%) | Magnesium oxide (%) | Modifier (%) |
|---|---|---|---|---|
| E.g. 1 | 4 | 20 | 44 | / |
| E.g. 3 | 4 | 20 | 44 | 0.15 |
| E.g. 4 | 2 | 20 | 44 | 0.15 |
| E.g. 5 | 6 | 20 | 44 | 0.15 |
| E.g. 6 | 4 | 17 | 44 | 0.15 |
| E.g. 7 | 4 | 23 | 44 | 0.15 |
| E.g. 8 | 4 | 20 | 40 | 0.15 |
| E.g. 9 | 4 | 20 | 48 | 0.15 |
| E.g. 10 | 0 | 20 | 44 | 0 |
| E.g. 11 | 8 | 20 | 44 | 0 |

The board material 100 of Example 3 to Example 11 was tested for various properties, and the test results are shown in Table 3 below:

TABLE 3

Test data of the board material 100 of Example 3 to Example 11

| Example | 2 h water-absorbing thickness swelling(%) | 24 h water-absorbing thickness swelling(%) | Moisture content(%) | Internal bonding strength (MPa) | Surface bonding strength (MPa) | Anti-halogen property |
|---|---|---|---|---|---|---|
| E.g. 1 | 1.9 | 2.1 | 5.1 | 2.3 | 1.7 | No water droplets, no moisture |
| E.g. 3 | 1.88 | 2.03 | 5.0 | 2.35 | 1.75 | No water droplets, no moisture |
| E.g. 4 | 1.93 | 2.15 | 5.15 | 2.25 | 1.65 | No water droplets, no moisture |
| E.g. 5 | 1.82 | 2.0 | 5.0 | 2.45 | 1.78 | No water droplets, no moisture |
| E.g. 6 | 1.85 | 2.03 | 5.2 | 2.4 | 1.72 | No water droplets, no moisture |

TABLE 3-continued

| | 2 h water-absorbing thickness swelling(%) | 24 h water-absorbing thickness swelling(%) | Moisture content(%) | Internal bonding strength (MPa) | Surface bonding strength (MPa) | Anti-halogen property |
|---|---|---|---|---|---|---|
| Example | | | | | | |
| E.g. 7 | 1.8 | 1.99 | 5.13 | 2.5 | 1.76 | No water droplets, no moisture |
| E.g. 8 | 1.82 | 2.01 | 5.1 | 2.33 | 1.71 | No water droplets, no moisture |
| E.g. 9 | 1.86 | 2.06 | 5.05 | 2.45 | 1.63 | No water droplets, no moisture |
| E.g. 10 | 1.9 | 2.1 | 5.12 | 2.0 | 1.6 | No water droplets, no moisture |
| E.g. 11 | 1.95 | 2.16 | 5.2 | 2.35 | 1.76 | Water droplets, moisture |

*Test data of the board material 100 of Example 3 to Example 11*

From the test results of Examples 1 to 9, it can be seen that the inorganic board 10 prepared of the inorganic gel of the present disclosure has a lower 2 h water absorbing thickness expansion rate, 24 h water absorbing thickness expansion rate and moisture content, and has a higher internal bonding strength and surface bonding strength, has a better anti-halogen property, and is not prone to moisture regeneration.

It can be seen from Examples 1, 10 and 11 that when magnesium chloride is added to the inorganic gel, the internal bonding strength and surface bonding strength of the inorganic board 10 can be improved. However, when the content of magnesium chloride in the inorganic gel is too high, the anti-halogen property of the inorganic board 10 is reduced and it is easy to regain moisture.

Example 12

The board material 100 of this embodiment is prepared by the following steps:

(1) Preparing the plywood 30: Providing four layers of 1.7 mm *Eucalyptus* veneer and a binder, the binder includes 60% melamine modified UF resin and 40% flour, coating the binder to three layers of *Eucalyptus* veneer, and then bond the four layers of *Eucalyptus* veneer in sequence, the coating amount of binder is 380 g/m$^2$, cold pressing for 30 min at a pressure of 5 kg/cm$^2$; hot pressing at a pressure of 10 kg/cm$^2$ and at a temperature of 120° C., the time of the hot pressing is 10 min, to obtain a plywood 30;

(2) Coating a first adhesive and a second adhesive on two opposite surfaces of the plywood 30 respectively, both the first adhesive and the second adhesive include 60% melamine modified UF resin and 40% flour, with a coating amount of 440 g/m$^2$;

(3) A 1.7 mm *Eucalyptus* veneer is provided as a backboard 50 and an inorganic board 10 of Example 1 is provided, and the inorganic board 10 and the backboard 50 are respectively attached to the two opposite surfaces of the plywood 30;

(4) Cold pressing is performed for 30 min under a pressure of 7 kg/cm$^2$; hot pressing is performed for 8 min under a pressure of 9 kg/cm$^2$ and a temperature of 120° C., to obtain a board material 100.

Example 13

The board material 100 of this example is prepared by the following steps:

(1) Preparing the inorganic composite board 10a: Providing two inorganic boards 10 of Example 1, a 0.3 mm thick okoume as a toughening layer 60 and a third adhesive, the third adhesive including 72% phenolic resin and 28% flour; coating the third adhesive on the two layers of inorganic boards 10, and placing the okoume between the two layers of inorganic boards 10, the coating amount of the third adhesive is 170 g/m$^2$; entering the cold press machine within 45 minutes, performing cold pressing for 30 minutes at a pressure of 5 kg/cm$^2$, after cold pressing, aged for 30 min; performing hot pressing for 13 min at a pressure of 10 kg/cm$^2$ and a temperature of 120 C°;

(2) Removing dust from the inorganic composite board 10a, providing impregnated paper on one surface of inorganic composite board 10a, providing balance paper on the other surface;

(3) Performing hot pressing for 38 s at a pressure of 72 kg/cm$^2$, with an upper steel plate temperature of 192 C.° and a lower steel plate temperature of 198 C.°, to obtain a large board, after 7 days of curing, the large board is cut, milled, and painted to obtain board material 100.

Example 14

The board material 100 of this example is prepared by the following steps:

(1) Preparing the inorganic composite board 10a: Providing two inorganic boards 10 of Example 1, a 0.3 mm thick okoume as a toughening layer 60 and a third adhesive, the third adhesive including 72% phenolic resin and 28% flour; coating the third adhesive on the two layers of inorganic boards 10, and placing the okoume between the two layers of inorganic boards 10, the coating amount of the third adhesive is 170 g/m$^2$; entering the cold press machine within 45 minutes, performing cold pressing for 30 minutes at a pressure of 5 kg/cm$^2$, after cold pressing, aged for 30 min; performing hot pressing for 13 min at a pressure of 10 kg/cm$^2$ and a temperature of 120 C°;

(2) Removing dust from the inorganic composite board 10a, coating the fourth adhesive on one side of the inorganic composite board 10a to form the fourth adhesive coating, and coating the fifth adhesive on the other surface of the inorganic composite board 10a to form the fifth adhesive coating. The coating amount of the fourth adhesive is 90 g/m², and the coating amount of the fifth adhesive is 110 g/m²; the fourth adhesive and the fifth adhesive both include 72% phenolic resin and 28% flour;

(3) Pasting a natural veneer (decorative layer 80) on the fourth adhesive coating, and pasting a 0.5 mm beech (balance layer 90) on the fifth adhesive coating;

(4) Performing cold pressing for 30 minutes at a pressure of 5 kg/cm²; performing hot pressing for 5 minutes at a pressure of 8 kg/cm² and a temperature of 110 C°, to obtain a large board, after 7 days of curing, the large board is cut and milled, board surfaces and backs are painted with UV paint, the tongue and groove are sealed with waterproof wax, plastic-sealed and packed, and put into storage.

Example 15

The board material 100 of this example is prepared by the following steps:

(1) Preparing the inorganic composite board 10a: Providing two inorganic boards 10 of Example 1, a 0.3 mm thick okoume as a toughening layer 60 and a third adhesive, the third adhesive including 72% phenolic resin and 28% flour; coating the third adhesive on the two layers of inorganic boards 10, and placing the okoume between the two layers of inorganic boards 10, the coating amount of the third adhesive is 170 g/m²; entering the cold press machine within 45 minutes, performing cold pressing for 30 minutes at a pressure of 5 kg/cm², after cold pressing, aged for 30 min; performing hot pressing for 13 min at a pressure of 10 kg/cm² and a temperature of 120 C°;

(2) Removing dust from the inorganic composite board 10a, roll-coating PUR glue on the upper and lower surfaces of the inorganic composite board 10a (that is, the fourth adhesive and the fifth adhesive are both PUR glue), the coating amount of PUR glue on the upper and lower surfaces is 60 g/m², and the upper and lower surfaces are both bonded with LVT, and then rolled;

(3) After rolling, performing cold pressing for 24 hours at a pressure of 8 kg/cm², to obtain a large board; the large board is cut and milled, the tongue and groove are sealed with waterproof wax, plastic-sealed and packed, and put into storage.

Example 16

The board material 100 of this example is prepared by the following steps:

(1) Providing the inorganic board 10 of Example 1;

(2) Removing dust from the inorganic board 10, providing an impregnated paper on one surface of the inorganic board 10, and providing a balancing paper on the other surface;

(3) Performing hot pressing for 38 seconds at a pressure of 72 kg/cm², with an upper steel plate temperature of 192° C. and a lower steel plate temperature of 198° C., to obtain a large board, after 7 days of curing, the large board is cut, milled, and painted to obtain board material 100.

Example 17

The board material 100 of this example is prepared by the following steps:

(1) Providing the inorganic board 10 of Example 1;

(2) Removing dust from the inorganic board 10, coating a fourth adhesive on one surface of the inorganic board 10 to form a fourth adhesive coating, and coating a fifth adhesive on the other surface to form a fifth adhesive coating, the coating amount of the fourth adhesive is 90 g/m², and the coating amount of the fifth adhesive is 110 g/m²; both the fourth adhesive and the fifth adhesive include 72% phenolic resin and 2 8% flour;

(3) Pasting a natural veneer (decorative layer 80) on the fourth adhesive coating, and pasting a 0.5 mm beech (balance layer 90) on the fifth adhesive layer;

(4) Performing cold pressing for 30 minutes at a pressure of 5 kg/cm²; Performing hot pressing for 5 minutes at a pressure of 8 kg/cm² and a temperature of 110 C°, to obtain large board, after 7 days of curing, the large board is cut and milled, board surfaces and backs are painted with UV paint, the tongue and groove are sealed with waterproof wax, plastic-sealed and packed, and put into storage.

Example 18

The board material 100 of this example is prepared by the following steps:

(1) Providing the inorganic board 10 of Example 1;

(2) Removing dust from the inorganic board 10, roll-coating PUR glue (i.e., the fourth adhesive and the fifth adhesive are both PUR glue) on the upper and lower surfaces of the inorganic board 10, the coating amount of PUR glue on the upper and lower surfaces is 60 g/m², and the upper and lower surfaces are both bonded to LVT, and then rolled;

(3) Performing cold pressing for 24 hours at a pressure of 8 kg/cm² to obtained a large board, the large board is cut and milled, the tongue and groove are sealed with waterproof wax, t plastic-sealed and packed, and put into storage.

The board material 100 of Examples 12 to 18 is tested for various properties, and the test results are shown in Table 4 below:

TABLE 4

| | | | | | | | |
|---|---|---|---|---|---|---|---|
| Test data of the board material 100 of Examples 12 to 18 | | | | | | | |
| Example | Formaldehyde (g/m³) | 2 h water-absorbing thickness swelling (%) | 24 h water-absorbing thickness swelling (%) | Moisture content (%) | Internal bonding strength (MPa) | Surface bonding strength (MPa) | Anti-halogen property |
| E.g. 12 | 0.23 | 1.9 | 2.9 | 6.9 | 1.7 | 1.5 | No water droplets, no moisture |

TABLE 4-continued

Test data of the board material 100 of Examples 12 to 18

| Example | Formaldehyde (g/m³) | 2 h water-absorbing thickness swelling (%) | 24 h water-absorbing thickness swelling (%) | Moisture content (%) | Internal bonding strength (MPa) | Surface bonding strength (MPa) | Anti-halogen property |
|---|---|---|---|---|---|---|---|
| E.g. 13 | 0.19 | 1.7 | 2.4 | 6.5 | 2.2 | 1.6 | No water droplets, no moisture |
| E.g. 14 | 0.22 | 2.0 | 2.8 | 7.0 | 2.1 | 1.5 | No water droplets, no moisture |
| E.g. 15 | 0.08 | 1.5 | 2.2 | 6.1 | 2.3 | 1.5 | No water droplets, no moisture |
| E.g. 16 | 0.17 | 1.0 | 2.2 | 6.4 | 2.6 | 1.6 | No water droplets, no moisture |
| E.g. 17 | 0.20 | 1.8 | 2.5 | 6.8 | 2.4 | 1.4 | No water droplets, no moisture |
| E.g. 18 | 0.03 | 1.0 | 2.0 | 6.0 | 2.5 | 1.5 | No water droplets, no moisture |

From the test results of Examples 12 to 18, it can be seen that the board material 100 prepared in this application has a lower formaldehyde emission, a lower 2 h water absorbing thickness expansion rate and a lower 24 h water absorbing thickness expansion rate, and has a higher internal bonding strength and surface bonding strength, has better anti-halogen property, and is not easy to absorb water and regain moisture.

Reference in the present disclosure to an "embodiment" or "implementation" means that a particular feature, structure, or characteristic described in combination with the embodiments may be included in at least one embodiment of the present disclosure. The appearances of the phrase in various places in the specification are not necessarily all referring to the same embodiment, nor are separate or alternative embodiments mutually exclusive of the other embodiments. It is explicitly and implicitly understood by a person skilled in the art that the embodiments described in the present disclosure may be combined with other embodiments. In addition, it should also be understood that, if there is no contradiction therebetween, the features, structures, or characteristics described in the embodiments of the present disclosure may be arbitrarily combined to form another embodiment that does not depart from the spirit and scope of the technical solutions of the present disclosure.

Finally, it should be noted that the foregoing implementations are only intended for describing the technical solutions of the present disclosure but not for limiting the present disclosure. Although the present disclosure is described in detail with reference to the above preferred embodiments, a person of ordinary skill in the art should understand that modifications or equivalent replacements can be made to the technical solutions of the present disclosure without departing from the spirit and scope of the technical solutions of the present disclosure.

The invention claimed is:

1. A board material, comprising:
an inorganic board, the inorganic board comprises a plant fiber and an inorganic material, in which the mass ratio of the inorganic material to the plant fiber is in the range of 1.2 to 1.5; the raw material components of the inorganic material comprise a magnesium sulfate and a magnesium oxide, the mass ratio of the magnesium sulfate to the magnesium oxide is in the range of 0.4 to 0.5; the raw material components of the inorganic material further comprise a magnesium chloride and a modifier, the mass ratio of magnesium chloride to magnesium oxide is in the range of 0.09 to 0.15; the modifier is citric acid; in the raw material components of the inorganic material, the mass ratio of the modifier to the magnesium chloride is in the range of 0.025 to 0.045; the 24 h water-absorbing thickness swelling of the inorganic board is less than or equal to 3%,
the raw material components of the inorganic material comprise: 2% to 6% magnesium chloride, based on the total weight of the raw material components of the inorganic material, 17% to 23% magnesium sulfate, based on the total weight of the raw material components of the inorganic material; and 40% to 48% magnesium oxide, based on the total weight of the raw material components of the inorganic material.

2. The board material according to claim 1, wherein before the citric acid is added, the citric acid is mixed with a portion of the magnesium sulfate to form a mixed solution, so that the mass ratio of the citric acid to the magnesium sulfate in the mixed solution ranges from 20 to 66.

3. The board material according to claim 1, wherein the raw material components of the inorganic material comprise the following components in parts by weight:
12 to 16 parts of magnesium chloride;
68 to 75 parts of magnesium sulfate;
150 to 170 parts of magnesium oxide;
0.3 to 1.2 parts of modifier; and
110 to 120 parts of water.

4. The board material according to claim 1, wherein the density p of the inorganic board ranges from 1 g/cm³≤p≤1.5 g/cm³; the 2 h water-absorbing thickness swelling of the inorganic board is less than or equal to 2%; the fire rating of the inorganic board is A2.

5. The board material according to claim 1, wherein the board material further comprises:
a first adhesive layer, the first adhesive layer is arranged on the surface of the inorganic board;

a plywood, the plywood is arranged on the surface of the first adhesive layer away from the inorganic board;

a second adhesive layer, the second adhesive layer is arranged on the surface of the plywood away from the first adhesive layer; and a backboard, the backboard is arranged on the surface of the second adhesive layer away from the inorganic board.

6. The board material according to claim 5, wherein the plywood comprises a plurality of bonding layers and a plurality of veneers, the bonding layers and the veneers are alternately stacked in sequence, the fibers of one of the two adjacent veneers extend along a first direction, and the fibers of the other of the two adjacent veneers extend along a second direction, wherein the first direction intersects with the second direction.

7. The board material according to claim 1, wherein the board material comprises a plurality of inorganic boards, the raw material components of each of the plurality of inorganic boards are the same as the raw material components of the inorganic material, the board material further comprises at least one toughening layer, the plurality of inorganic boards and the at least one toughening layer are alternately stacked in sequence to form an inorganic composite board, and the at least one toughening layer is a veneer or non-woven fabric.

8. The board material according to claim 1, wherein the board material further comprises:

a decorative layer, the decorative layer is arranged on one side of the inorganic board; and a balancing layer, the balancing layer is arranged on the other side of the inorganic board.

9. The board material according to claim 1, wherein the mass ratio of magnesium chloride to magnesium oxide is in the range of 0.10 to 0.15.

10. The board material according to claim 8, wherein the decorative layer comprises at least one of natural veneer, impregnated paper, luxury vinyl tile, and polyethylene terephthalate layer.

11. The board material according to claim 8, wherein the balancing layer comprises at least one of thin veneer, balancing paper, luxury vinyl tile, and polyethylene terephthalate layer.

12. The board material according to claim 11, wherein the thin veneer is natural veneer or technical wood.

13. The board material according to claim 8, wherein when the decorative layer is impregnated paper and the balancing layer is balancing paper, the decorative layer and the balancing layer are directly bonded by a hot pressing without the use of an adhesive.

* * * * *